US010712228B2

(12) United States Patent
Murata et al.

(10) Patent No.: US 10,712,228 B2
(45) Date of Patent: Jul. 14, 2020

(54) BLOCKAGE DIAGNOSIS DEVICE

(71) Applicant: HONDA MOTOR CO., LTD., Tokyo (JP)

(72) Inventors: Yuichiro Murata, Wako (JP); Hiroki Ishikawa, Wako (JP); Daijiro Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 150 days.

(21) Appl. No.: 16/162,448

(22) Filed: Oct. 17, 2018

(65) Prior Publication Data
US 2019/0120716 A1 Apr. 25, 2019

(30) Foreign Application Priority Data
Oct. 20, 2017 (JP) .................................. 2017-203247

(51) Int. Cl.
*G01M 3/28* (2006.01)
*G01F 22/02* (2006.01)
*F02M 25/08* (2006.01)

(52) U.S. Cl.
CPC ...... *G01M 3/2876* (2013.01); *F02M 25/0809* (2013.01); *F02M 25/0818* (2013.01); *F02M 25/0836* (2013.01); *G01F 22/02* (2013.01)

(58) Field of Classification Search
CPC ........... F02M 25/0809; F02M 25/0818; F02M 25/0836; G01F 22/02
See application file for complete search history.

(56) References Cited

U.S. PATENT DOCUMENTS

| 5,205,263 | A | * | 4/1993 | Blumenstock | ..... F02M 25/0809 123/520 |
| 5,230,319 | A | * | 7/1993 | Otsuka | ............... F02M 25/0809 123/198 D |
| 5,295,472 | A | * | 3/1994 | Otsuka | ............... F02M 25/0809 123/198 D |
| 5,400,759 | A | * | 3/1995 | Ishida | ................ F02M 25/0809 123/198 D |
| 5,443,051 | A | * | 8/1995 | Otsuka | ............... F02M 25/0809 123/198 D |

(Continued)

FOREIGN PATENT DOCUMENTS

JP 2014-126006 A 7/2014

*Primary Examiner* — David A. Rogers
(74) *Attorney, Agent, or Firm* — Rankin, Hill & Clark LLP

(57) ABSTRACT

A blockage diagnosis device includes a diagnosis unit that performs blockage diagnosis on a vent passage based on a change over time in an internal pressure of the vent passage in association with the operation of a negative pressure pump. A primary determination unit of the diagnosis unit makes a primary determination that the vent passage is blocked, if a first estimation volume V1 is less than a preset threshold volume Vth. A secondary determination unit of the diagnosis unit makes a secondary determination that the vent passage is blocked, if the second estimation volume V2 is less than the threshold volume Vth. If the primary determination indicating that the vent passage is blocked is made in the primary determination unit, and the secondary determination indicating that the vent passage is blocked is made in the secondary determination unit, the diagnosis unit determines that the vent passage is blocked.

8 Claims, 12 Drawing Sheets

(56) References Cited

U.S. PATENT DOCUMENTS

| | | | | |
|---|---|---|---|---|
| 6,164,123 A * | 12/2000 | Corkill | F02M 25/0809 | 123/518 |
| 6,536,261 B1 * | 3/2003 | Weldon | F02M 25/0809 | 123/520 |
| 6,658,925 B2 * | 12/2003 | Cook | F02M 25/0809 | 123/516 |
| 8,155,917 B2 * | 4/2012 | Maegawa | G01F 22/02 | 702/140 |
| 8,935,081 B2 * | 1/2015 | Jackson | F02M 25/0809 | 123/198 D |
| 8,950,244 B2 * | 2/2015 | Nishimura | F02M 25/0809 | 73/47 |
| 9,038,489 B2 * | 5/2015 | Jackson | F02M 25/0809 | 73/114.39 |
| 9,097,216 B2 * | 8/2015 | Itoh | F02M 25/0854 | |
| 9,316,558 B2 * | 4/2016 | Jackson | G01L 27/007 | |
| 9,404,463 B2 * | 8/2016 | Guo | F02N 11/0829 | |
| 2001/0032626 A1 * | 10/2001 | Fabre | F02M 25/0809 | 123/520 |
| 2002/0179066 A1 * | 12/2002 | Matsumoto | F02M 25/0809 | 123/520 |
| 2003/0183206 A1 * | 10/2003 | Fujimoto | F02D 41/0045 | 123/520 |
| 2003/0226549 A1 * | 12/2003 | Takagi | F02M 25/0818 | 123/520 |
| 2004/0200460 A1 * | 10/2004 | Mitani | F02M 25/0818 | 123/520 |
| 2006/0144370 A1 * | 7/2006 | Iihoshi | F02M 25/0809 | 123/491 |
| 2009/0266147 A1 * | 10/2009 | Maegawa | F02M 25/0818 | 73/40.7 |
| 2011/0011472 A1 * | 1/2011 | McLain | F02M 25/0809 | 137/624.12 |
| 2011/0253110 A1 * | 10/2011 | Fukui | F02D 41/004 | 123/520 |
| 2012/0097252 A1 * | 4/2012 | McLain | F02M 25/0809 | 137/1 |
| 2013/0184963 A1 * | 7/2013 | Jackson | F02M 25/0809 | 701/101 |
| 2014/0102421 A1 * | 4/2014 | Kato | F02M 25/0818 | 123/520 |
| 2014/0182360 A1 | 7/2014 | Horiba | | |
| 2018/0045127 A1 * | 2/2018 | Miura | B60K 15/035 | |
| 2018/0100470 A1 * | 4/2018 | Ooiwa | F02M 25/0809 | |
| 2018/0274492 A1 * | 9/2018 | Uchida | F02D 41/0045 | |

* cited by examiner

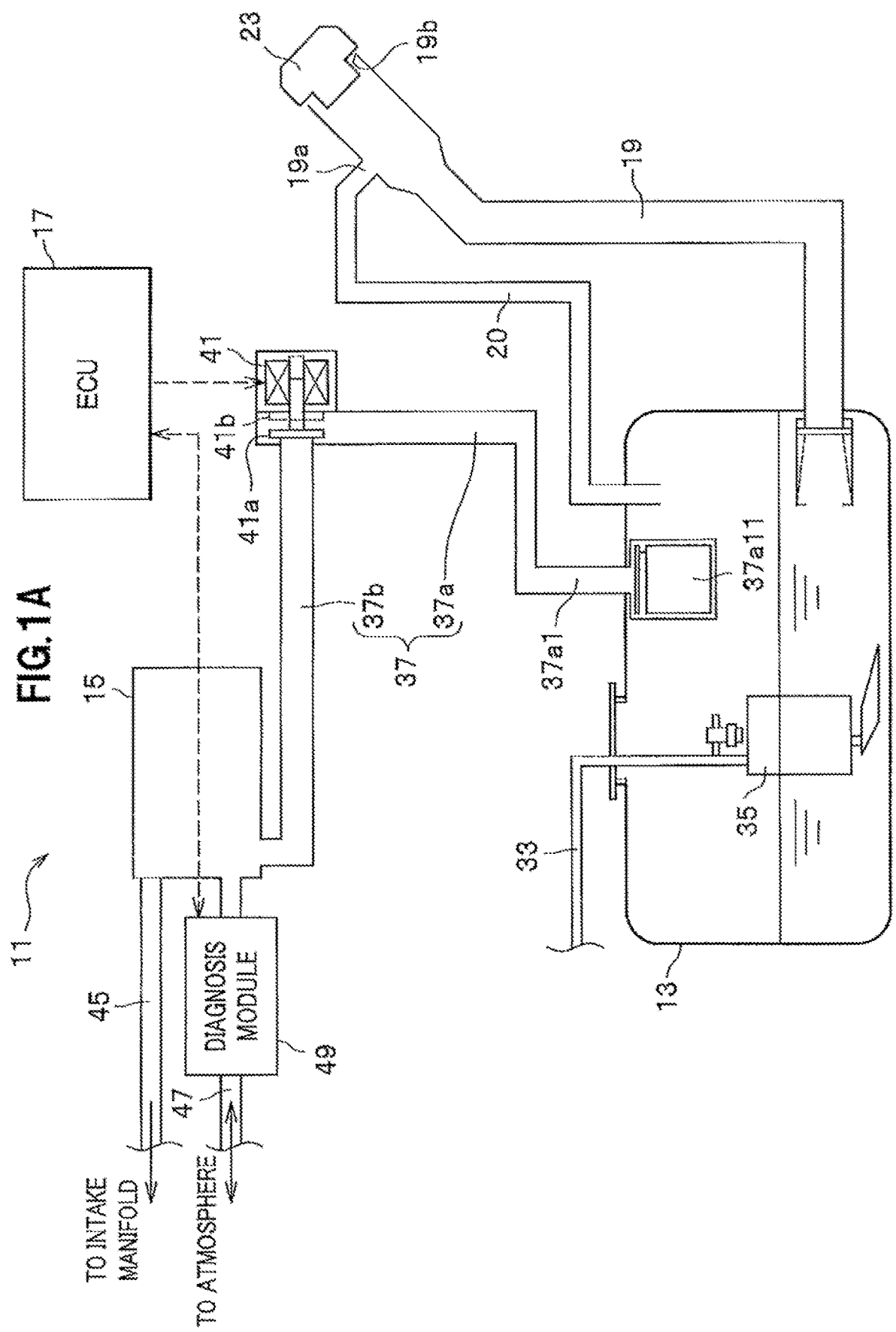

DURING NORMAL OPERATION

WHEN DIAGNOSED AS BLOCKED

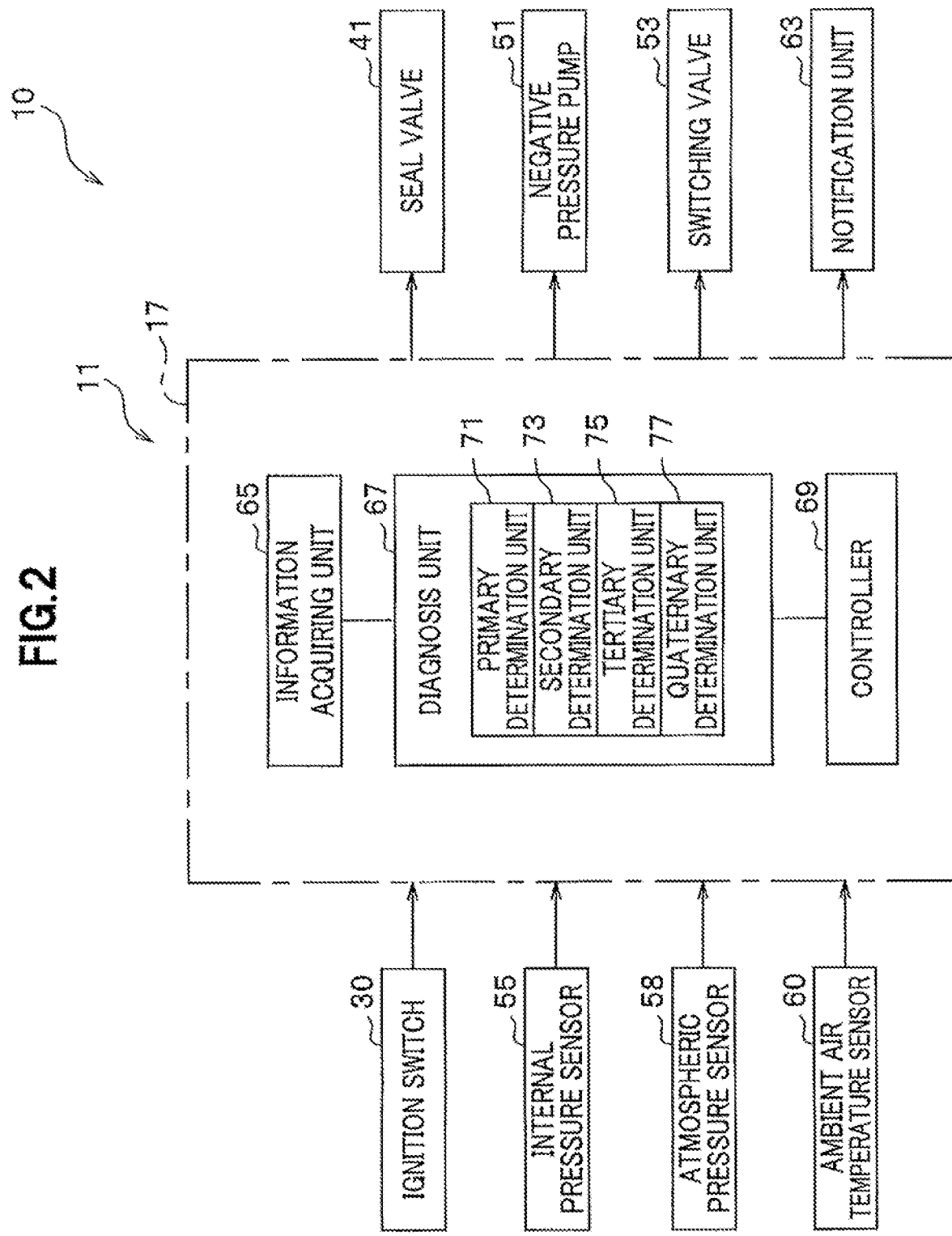

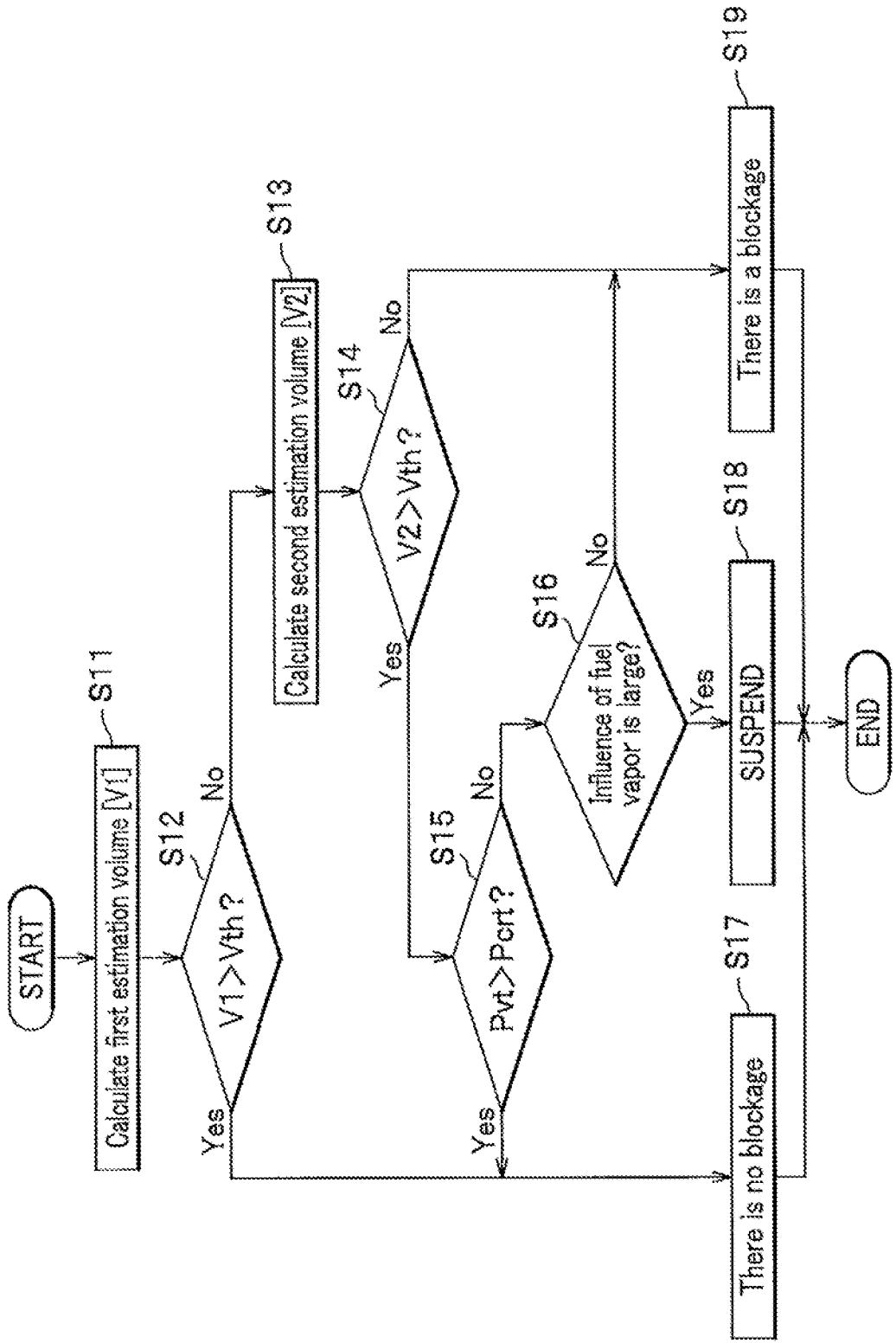

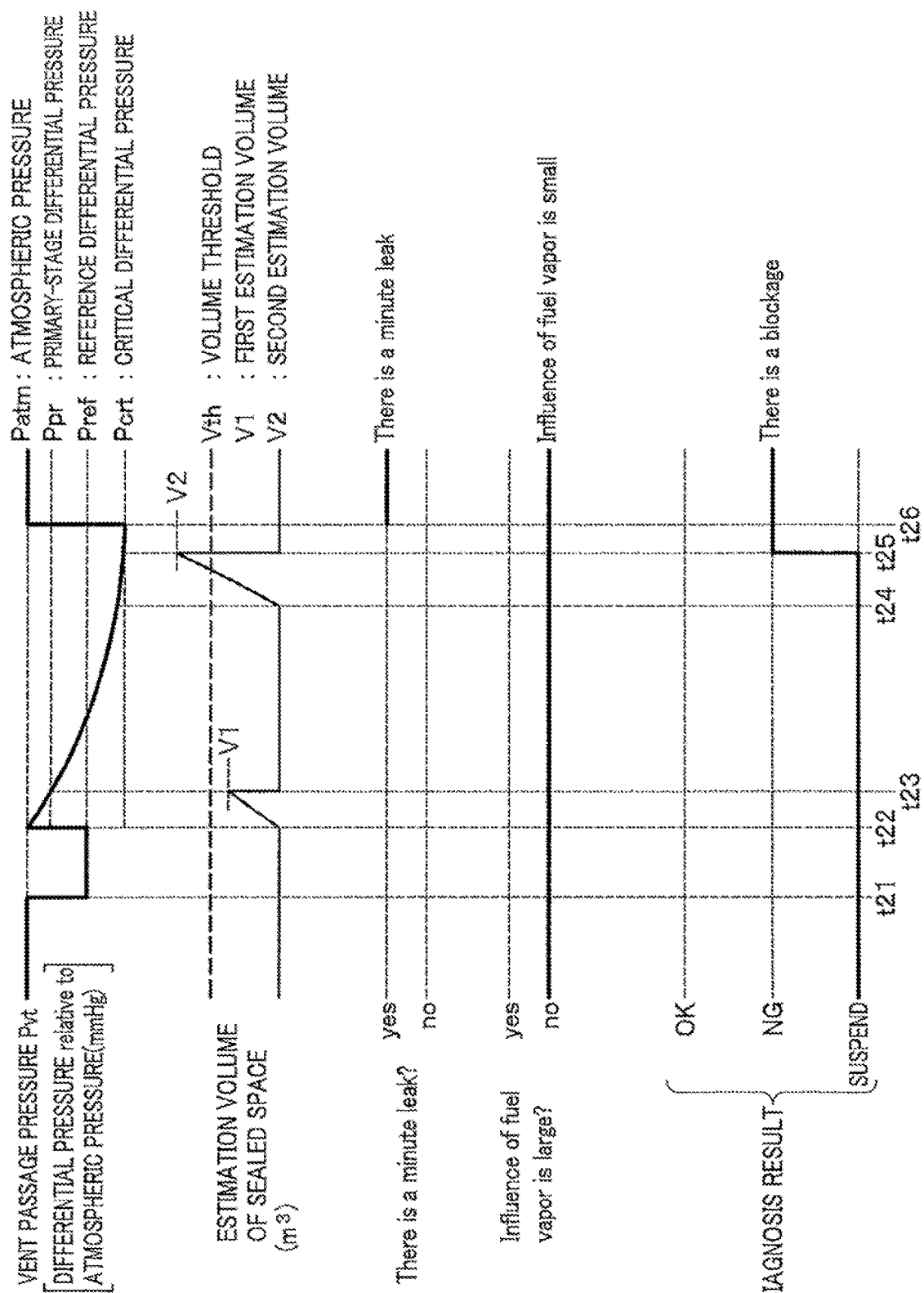

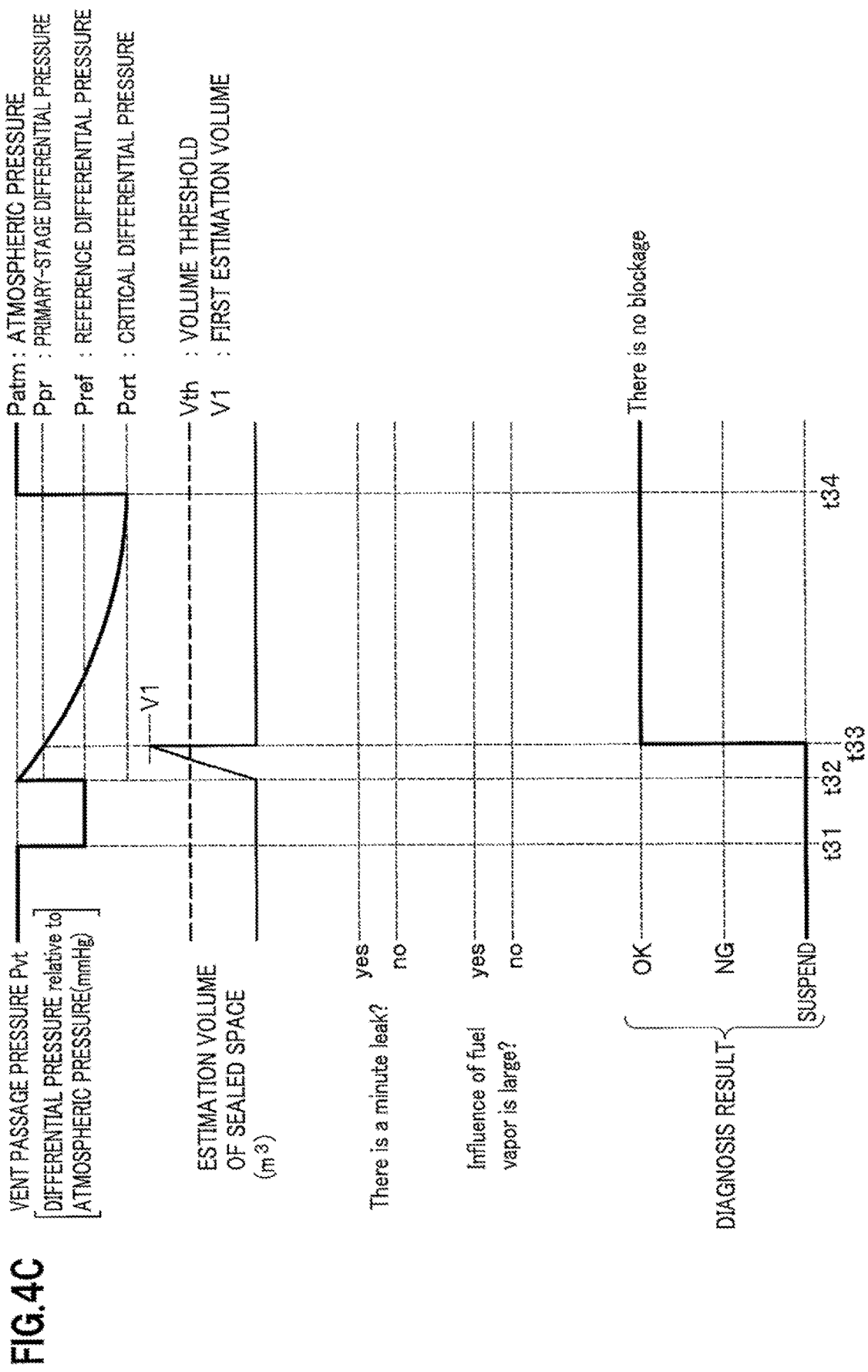

FIG.5B
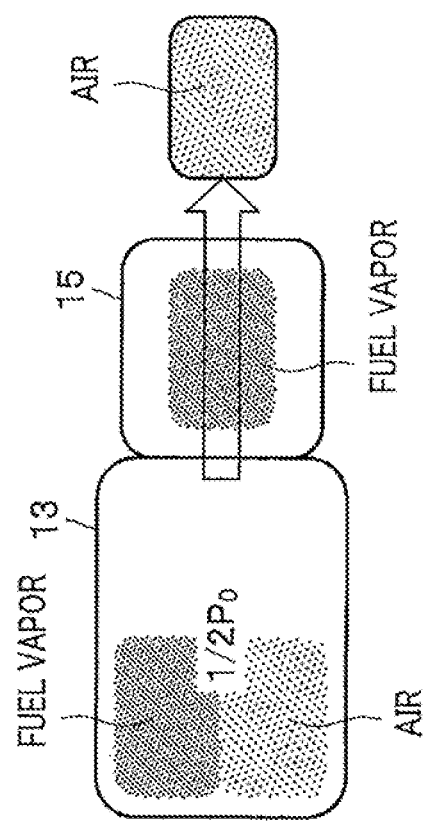
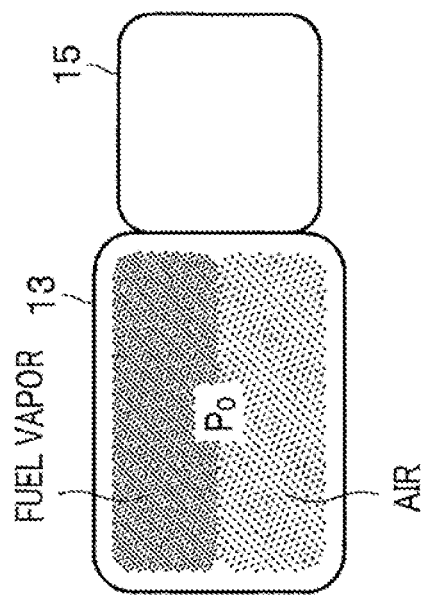

BLOCKAGE DIAGNOSIS DEVICE

CROSS REFERENCES TO RELATED APPLICATIONS

The present application claims priority under 35 U.S.C. § 119 to Japanese patent Application No. 2017-203247, filed on Oct. 20, 2017, the disclosures of all of which are hereby incorporated by reference in their entireties.

TECHNICAL FIELD

The present invention relates to a blockage diagnosis device for performing a blockage diagnosis on a vent passage for communicating between an internal space of a fuel tank and a canister.

BACKGROUND

If liquid fuel is supplied into the fuel tank of a vehicle including an internal-combustion engine, for example, the occupied volume of the fuel increases in the internal space of the fuel tank. Accordingly, the occupied volume of the gas phase region in the internal space relatively decreases. Thus, the pressure of the gas phase region (hereinafter referred to as a "tank internal pressure") becomes higher than the atmospheric pressure. As a result, fuel vapor accumulated in the gas phase region of the fuel tank attempts to escape into the atmosphere. If the fuel vapor gas escapes into the atmosphere, the atmosphere is contaminated.

Accordingly, in order to prevent atmospheric contamination caused by escape of the fuel vapor into the atmosphere, conventional fuel tank system has a canister in a vent passage between the fuel tank and the atmosphere. The canister includes an adsorbent that temporarily absorbs the fuel vapor. The absorbent of the canister absorbs the fuel vapor to maintain the tank internal pressure maintained at a low level.

For example, Japanese Patent Application Publication No. 2014-126006 describes an fuel vapor processing device having a seal valve that is provided in a communication passage between a fuel tank and a canister, and that shuts off the fuel tank from atmosphere, a canister, and a diagnosis module that has a leak diagnosis function of an fuel vapor sealing system. The diagnosis module includes a switching valve that opens or closes communication of the canister with the atmosphere, an internal pressure sensor, a flow rate controller that makes the seal valve and the switching valve to be opened and closed, a diagnosis unit that performs leak diagnosis on the fuel vapor sealing system, and a negative pressure pump that generates pressure in the fuel vapor sealing system.

The diagnosis unit of the diagnosis module performs a leak diagnosis on a whole fuel vapor sealing system before a leak diagnosis on the canister section. The diagnosis unit performs a diagnosis function of the seal valve by determining whether a detection value detected by the tank internal pressure sensor varies beyond a predetermined range relative to pressure generated by the negative pressure pump, with the seal valve closed and the switching valve closed.

The fuel vapor processing device according to the Japanese Patent Application Publication No. 2014-126006 performs a diagnosis on function of the seal valve properly.

SUMMARY

In the fuel vapor processing device according to the Japanese Patent Application Publication No. 2014-126006, the blockage diagnosis on the vent passage is assumed to be performed using the pressure generated by the negative pressure pump with the seal valve in an open state. In such a case, for example, an operation unit time of the negative pressure pump is multiplied by a reference emission speed by the negative pressure pump, so that the emission amount per unit time, that is, a sealed spatial volume of the fuel vapor sealing system including the vent passage and the fuel tank can be estimated to perform the blockage diagnosis on the vent passage based on whether the estimated value of the sealed spatial volume converges to a predetermined reference range.

However, according to studies by the inventors of the present invention, the estimated value of the sealed spatial volume tends to vary significantly depending on disturbances such as the amount of remaining fuel in the fuel tank, an increase of decrease of atmospheric temperature and atmospheric pressure around the fuel tank or the like. If the estimated value of the sealed spatial volume significantly varies in such a way depending on disturbances as described above, diagnosis accuracy may be impaired when the blockage diagnosis on the vent is performed based on the estimated value of the sealed spatial space.

Accordingly, it is an object of the present invention to provide a blockage diagnosis device that performs with high accuracy the blockage diagnosis on the vent passage based on the estimated value of the sealed spatial volume, even if the estimated value of the sealed spatial volume of the fuel vapor sealing system including the vent passage and the fuel tank varies significantly depending on the disturbance such as the amount of the remaining fuel in the fuel tank, for example.

In order to achieve the above object, a first aspect of the present invention is a blockage diagnosis device that is applied to a fuel tank system having a fuel tank for containing fuel, a canister for absorbing fuel vapor generated in an internal space of the fuel tank, and a vent passage for communicating between the internal space of the fuel tank and the canister, and that performs blockage diagnosis on a vent passage, and that performs blockage diagnosis on the vent passage; the blockage diagnosis device including: an information acquiring unit that acquires information on internal pressure of the vent passage; a flow rate controller that performs flow rate control of fluid in the vent passage by operation of a negative pressure source; and a blockage diagnosis unit that performs blockage diagnosis on the vent passage, based on a change over time in the internal pressure of the vent passage in association with the operation of the negative pressure source, wherein a blockage diagnosis period during which the blockage diagnosis on the vent passage is performed includes a first period of time that starts at an operation starting time of the negative pressure source or after lapse of a first predetermined time relative to the operation starting time, and a second period of time that ends at an operation finishing time of the negative pressure source or at time going back from the operation finishing time by a second predetermined time, the first and second periods of times being shifted from each other so as not to be overlapped with each other, and the blockage diagnosis unit includes a primary determination unit that estimates in the first period of time, a sealed spatial volume of fuel vapor sealing system having the vent passage and the fuel tank based on a time length required for reducing an internal pressure of the vent passage by a first differential pressure in association with the operation of the negative pressure source and an emission speed of the fluid, and then performs a primary determination of the vent passage, based on whether a first estimation volume obtained by the estimation exceeds a preset threshold volume, and a secondary determination unit that estimates in the second period of time, the sealed spatial volume based on the time length required for reducing the internal pressure of the vent passage by a second pressure in association with the operation of the negative pressure source, and an emission speed of the fluid, and then performs a secondary determination of the vent passage, based on whether a second estimation volume obtained by the estimation exceeds the threshold volume, wherein the primary determination unit of the blockage diagnosis unit, if the first estimation volume is less than the threshold volume, makes a primary determination indicating that the vent passage is blocked, the secondary determination unit of the blockage diagnosis unit, if the second estimation volume is less than the threshold volume, makes a secondary determination indicating that the vent passage is blocked, and the blockage diagnosis unit, if the primary determination unit makes the primary determination indicating that vent passage is blocked, and the secondary determination unit makes the secondary determination indicating that the vent passage is blocked, determines that the vent passage is blocked.

According to the first aspect of the present invention, the blockage diagnosis unit performs blockage diagnosis on the vent passage based on a change over time in the internal pressure of the vent passage in association with the operation of the negative pressure source. The primary determination unit of the blockage diagnosis unit makes the primary determination that the vent passage is blocked, if the first estimation volume that is the estimation result of the sealed spatial volume of the fuel vapor sealing system obtained during the first period of time is less than a threshold volume. The secondary determination unit of the blockage diagnosis unit makes the secondary determination that the vent passage is blocked, if the second estimation volume that is the estimation result of the sealed spatial volume of the fuel vapor sealing system obtained during the second period of time is less than the threshold volume. If the primary determination indicating that the vent passage is blocked is made in the primary determination unit, and the secondary determination indicating that the vent passage is blocked is made in the secondary determination unit, the blockage diagnosis unit determines that the vent passage is blocked.

Advantageous Effects of the Disclosure

According to the present invention, even if the estimated value of the sealed spatial volume of the fuel vapor sealing system including the vent passage and the fuel tank significantly varies, depending on the disturbance such as the amount of remaining fuel in the fuel tank, for example, it is possible to perform the blockage diagnosis on the vent passage with high accuracy, based on the estimated value of the sealed spatial volume.

BRIEF DESCRIPTION OF THE DRAWINGS

FIG. 1A is a schematic illustration of a blockage diagnosis device according to an embodiment of the present invention;

FIG. 2 is a functional block diagram of the blockage diagnosis device according to the embodiment of the present invention.

FIG. 3 is a flowchart showing a blockage diagnosis process performed by the blockage diagnosis device according to the embodiment of the present invention;

FIG. 4B is time chart showing a temporal transition of respective values relative to the blockage diagnosis in case2 when the internal pressure of the vent passage having blockage abnormality is reduced using the negative pressure pump;

FIG. 4C is time chart showing the temporal transitions of respective values relative to the blockage diagnosis in case3 when an internal pressure of the vent passage in a normal state having no blockage abnormality is reduced using the negative pressure pump;

FIG. 5B is an illustration conceptually showing the mechanism by which the internal pressure is changed when the sealed space is reduced in pressure for the predetermined time using the negative pressure pump, in a case where the fuel vapor exists in the fuel tank;

DETAILED DESCRIPTION

Hereinafter, a blockage diagnosis device according to an embodiment of the present invention will be described later in detail with reference to the accompanying drawings as appropriate.

[Outline of Blockage Diagnosis Device 11 According to Embodiment of Disclosure]

A blockage diagnosis device 11 according to an embodiment of the present invention will be schematically described first with reference to the drawings. The blockage diagnosis device 11, which is included in a fuel vapor processing device 10 processing fuel vapor, is applied to a hybrid vehicle including an internal-combustion engine and an electric motor (neither is shown) as a drive source.

Note that the same reference signs are used in the following drawings for the same members or corresponding members. In addition, for convenience of description, in some cases, the diameters and shapes of the members may be altered or enlarged so as to be schematically drawn.

Figure 1B:
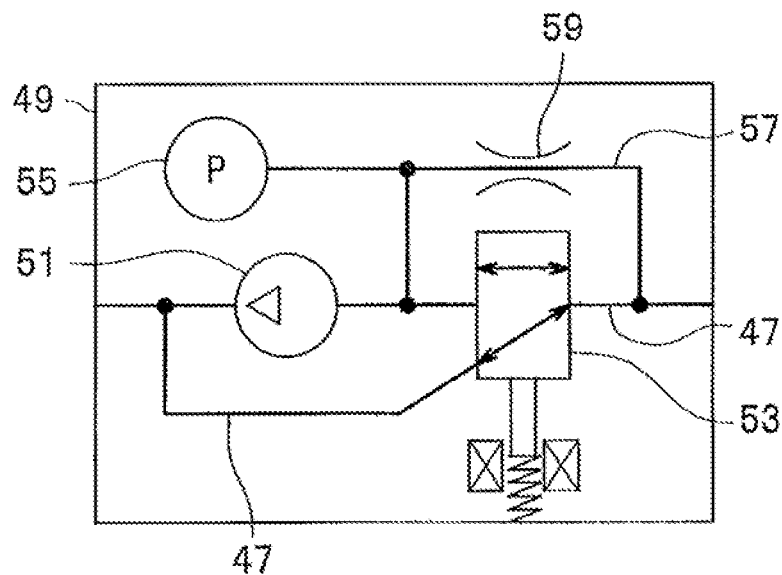
FIG. 1B is a schematic illustration of a diagnosis module (during normal operation) provided in the blockage diagnosis device according to the embodiment of the present invention.
Figure 1C:
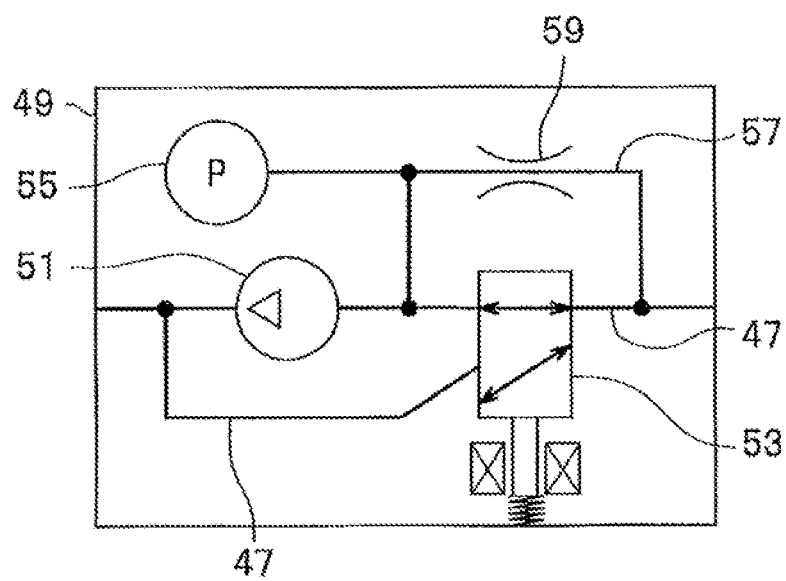
FIG. 1C is a schematic illustration of the diagnosis module (when diagnosed as blocked) provided in the blockage diagnosis device according to the embodiment of the present invention.

FIG. 1A is a schematic illustration of the blockage diagnosis device 11 according to the embodiment of the present invention. FIG. 1B is a schematic illustration of a diagnosis module 49 provided in the blockage diagnosis device 11 (during normal operation). FIG. 1C is a schematic illustration of the diagnosis module 49 (when diagnosed as blocked), provided in the blockage diagnosis device 11. FIG. 2 is a functional block diagram of the blockage diagnosis device 11.

As shown in FIG. 1A, a fuel vapor processing device 10 that includes the blockage diagnosis device 11 is provided with a fuel tank 13 that stores fuel such as gasoline, a canister 15 having a function of absorbing fuel vapor generated in a fuel tank 13 and an electronic control unit (ECU) 17 that performs overall control of the blockage diagnosis device 11.

The fuel tank 13 includes a fuel inlet pipe 19. The fuel inlet pipe 19 has its upstream portion 19a of the fuel inlet pipe 19 communicated with the fuel tank 13 via a circulation pipe 20. In addition, the fuel inlet pipe 19 has a fill opening 19b at an opposite from the fuel tank 13. The fill opening 19b allows a nozzle of a fueling gun (neither is shown) to be inserted thereinto. The fill opening 19b has a screw cap 23 attached thereto.

The fuel tank 13 includes a fuel pump module 35 that pumps fuel contained in the fuel tank 13 and delivers it to an injector (not shown) via a fuel supply passage 33. In addition, the fuel tank 13 has a vent passage 37 arranged to communicate between the fuel tank 13 and with the canister 15. The vent passage 37 functions as a flow passage of the fuel vapor.

A passage 37a1 of the vent passage 37, adjacent to the fuel tank 13, includes a float valve 37a11. The float valve 37a11 operates so as to close the passage 37a1 if the liquid level of fuel rises to increase a tank internal pressure, which is the pressure in the gas phase region in the fuel tank 13. More specifically, if the fuel tank 13 is fully filled with fuel, the float valve 37a11 is closed to prevent fuel from entering the evaporated fuel discharging passage 37 from the fuel tank 13.

A seal valve is provided in the middle of the vent passage 37. Note that in the following description, the vent passage 37 has two sections divided at the position of the seal valve 41. One of the sections adjacent to the fuel tank 13 is also referred to as a "first vent passage 37a." The other section of the vent passage 37 adjacent to the canister 15 is also referred to as a "second vent passage 37b." In addition, the first vent passage 37a and the second vent passage 37b are collectively referred to as the "vent passage 37."

The seal valve 41 has a function of sealing the internal space of the fuel tank 13 from the atmosphere (see a reference sign 41a in FIG. 1A, indicating a closed state), or allowing the internal space to communicate with the atmosphere (see a reference sign 41b in FIG. 1A, indicating an open state). More specifically, the seal valve 41 is a normally-closed electromagnetic valve that operates in response to an open/close control signal sent from the ECU 17. The seal valve 41 operates so as to seal the internal space of the fuel tank 13 from the atmosphere or allow the internal space to communicate with the atmosphere in accordance with the open/close control signal.

The canister 15 connected to the second vent passage 37b includes the adsorbent (not shown) formed of active charcoal for absorbing the fuel vapor. The adsorbent of the canister 15 absorbs the fuel vapor delivered from the fuel tank 13 via the vent passage 37. In addition to the second vent passage 37b, the canister 15 is connected to a purge passage 45 and an atmospheric air introduction passage 47 so as to communicate with the purge passage 45 and the atmospheric air introduction passage 47. The canister 15 performs purge processing in which the air drawn via the atmospheric air introduction passage 47 is delivered to an intake manifold through the purge passage 45 together with the fuel vapor absorbed by the adsorbent of the canister 15.

An opposite end of the purge passage 45 from the canister 15 is connected to the intake manifold (not shown) so as to communicate with the intake manifold. In contrast, an opposite end of the atmospheric air introduction passage 47 from the canister 15 communicates with the atmosphere. The atmospheric air introduction passage 47 has a diagnosis module 49 provided therein.

The diagnosis module 49 is a functional member that is used for performing leak diagnosis and blockage diagnosis on the fuel vapor sealing system. As shown in FIGS. 1B and 1C, the diagnosis module 49 includes the atmospheric air introduction passage 47 and a bypass passage 57 disposed parallel to the atmospheric air introduction passage 47. The atmospheric air introduction passage 47 includes a switching valve 53. The switching valve 53 has a function of opening or closing the canister 15 with respect to the atmosphere. More specifically, the switching valve 53 is an electromagnetic valve that operates in accordance with a switching signal sent from the ECU 17. When the switching valve 53 is not energized and is in an OFF mode, the switching valve 53 allows the canister 15 to communicate with the atmosphere (see FIG. 1B). In contrast, when the switching valve 53 is in an ON mode to have a switching signal received from the ECU 17, the switching valve 53 closes the canister 15 off from the atmosphere (see FIG. 1C).

The bypass passage 57 includes a negative pressure pump 51, an internal pressure sensor 55, and a reference orifice 59. The negative pressure pump 51 is a constant-volume pump which discharges gas by a constant amount of volume per unit time. The negative pressure pump 51 has a function to make the internal pressure of the fuel vapor sealing system be a negative pressure to the atmospheric pressure Patm by discharging fluid of an fuel vapor sealing system to the atmosphere. The negative pressure pump 51 corresponds to "negative pressure source" of the present invention.

Here, the term "fuel vapor sealing system" refers to a closed space including the fuel tank 13, the vent passage 37, the seal valve 41, the canister 15, the atmospheric air introduction passage 47, and the diagnosis module 49. The fuel vapor sealing system includes: a fuel tank section and a canister section. The fuel tank section is a closed space extending from the fuel tank 13 to the seal valve 41 via the first vent passage 37a. The canister section is a closed space extending from the seal valve 41 to the canister 15 via the second vent passage 37b and further extending to the diagnosis module 49 via the atmospheric air introduction passage 47. Note that, the closed space in the fuel vapor sealing system may be referred to as a "sealed space" in the following description.

The internal pressure sensor 55 has a function of detecting an internal pressure of the fuel vapor sealing system. However, if the negative pressure pump 51 doesn't perform sucking operation with the switching valve 53 switched to an "atmosphere communication position" (see FIG. 1B) at which the canister 15 can communicate with the atmosphere, the internal pressure sensor 55 detects the atmospheric pressure Patm.

In contrast, if the negative pressure pump 51 performs sucking operation through a reference orifice 59 with the seal valve 53 switched to the atmosphere communication position, the internal pressure sensor 55 detects a reference differential pressure Pref (see FIG. 4A, for example) that is a negative pressure to the atmospheric pressure Patm. The reference differential pressure Pref converges to a negative pressure value obtained when the negative pressure pump 51 performs sucking operation with a leak hole having the same diameter as a diameter d of the reference orifice 59 formed in the vent passage 37.

The detection value (negative pressure value) detected by the internal pressure sensor 55 converged in such a way is stored in a nonvolatile memory (not shown) provided in the ECC 17 as a leak determination threshold value. The leak determination threshold value is used as a guide to determine whether a leak hole having a diameter larger than the diameter d of the reference orifice 59 is formed in the fuel vapor sealing system. Note that, the diameter d of the reference orifice 59 is appropriately set in consideration of the diameter of a leak hole to be determined.

Further, if the fuel tank 13 and the canister 15 communicate with each other through the vent passage 37, with the sealing valve 41 opened (see a reference sign 41b indicating an open state in FIG. 1A), in a state that the switching valve 53 is switched to an atmosphere close position (see FIG. 1C) at which the canister 15 is closed from the atmosphere, the internal pressure sensor 55 detects the internal pressure Pvt of the vent passage 37 (hereinafter, may be abbreviated as "vent passage pressure Pvt"). In this case, the vent passage pressure Pvt is equal to the internal pressure of the fuel tank 13 and the internal pressure of the canister 15. The pressure information detected by the internal pressure sensor 55 is sent to the ECU 17.

The reference orifice 59 is used when a leak determination threshold value is set for determining whether there is a leakage when leak diagnosis on the fuel vapor sealing system is performed. Further, the reference orifice 59 is used for calculating a reference emission speed Qref prior to the blockage diagnosis. The procedure for calculating the reference emission speed Qref will be described in detail later.

As shown in FIG. 2, an ignition switch 30, the internal pressure sensor 55, an atmospheric pressure sensor 58 having a function of detecting the atmospheric pressure Patm and an ambient air temperature sensor 60 having a function of detecting the ambient air temperature To are connected as an input system to the ECU 17 which serves as a "controller" of the present invention. The atmospheric pressure information detected by the atmospheric pressure sensor 58 and the ambient air temperature information detected by the ambient air temperature sensor 60 are sent to the ECU 17.

In addition, as shown in FIG. 2, the seal valve 41, the negative pressure pump 51, the switching valve 53, and a notification unit 63 are connected as an output system to the ECU 17. The notification unit 63 notifies information regarding the leak diagnosis and blockage diagnosis on the fuel vapor sealing system. More specifically, a display unit (not shown), such as a liquid crystal display, or a sound output unit (not shown), such as a speaker, disposed in the interior of the vehicle can be suitably used as the notification unit 63.

As shown in FIG. 2, the ECU 17 includes an information acquiring unit 65, a diagnosis unit 67, and a flow rate controller 69. The ECU 17 is formed from a micro computer including a central processing unit (CPU), a read only memory (ROM), and a random access memory (RAM). The micro computer retrieves a program and data stored in the ROM and performs execution control of various functions, such as an information acquiring function and a blockage diagnosis function of the ECU 17, and an integrated control function of the entire blockage diagnosis device 11.

The information acquiring unit 65 has a function of acquiring pressure information, such as of the vent passage 37, detected by the internal pressure sensor 55, an atmospheric pressure information detected by the atmospheric pressure sensor 55, and the ambient air temperature information detected by the ambient air temperature sensor 60.

The diagnosis unit 67 has a function of performing leak diagnosis and blockage diagnosis on the fuel vapor sealing system. More specifically, the diagnosis unit 67 includes a primary determination unit 71, a secondary determination unit 73, a tertiary determination unit 75 and a quaternary determination unit 77.

The primary determination unit 71, in a first period of time (a period of time from time t12 to time t13 in FIG. 4A, for example) of a blockage diagnosis period (a period of time from time t12 to time t16 in FIG. 4A, for example) during which blockage diagnosis on the vent passage 37 is made, estimates a sealed spatial volume of the fuel vapor sealing system based on time required for the vent passage pressure Pvt being reduced by a first differential pressure (a primary-stage differential pressure: see FIGS. 4A to 4E) to the atmospheric pressure Patm, in association with the operation of the negative pressure pump 51 and the emission speed of fluid (details of which will be described later), and then performs a primary determination of the vent passage 37, based on whether the first estimation volume V1 (see FIGS. 4A to 4E) obtained as a result of the estimation exceeds a preset threshold volume Vth (see FIGS. 4A to 4E). The primary determination of the vent passage 37 will be described later in detail.

The secondary determination unit 73, in a second period of time of a blockage diagnosis period (a period of time from time t14 to time t15 in FIG. 4A, for example) during which blockage diagnosis on the vent passage 37 is made, estimates a sealed spatial volume of the fuel vapor sealing system based on time required for the vent passage pressure Pvt to be reduced by a second differential pressure (a later-stage differential pressure: see FIGS. 4A to 4E) to the atmospheric pressure Patm, in association with the operation of the negative pressure pump 51 and the emission speed of fluid, and then performs a secondary determination of the vent passage 37, based on whether a second estimation volume V2 (see FIGS. 4A to 4E) obtained as a result of the estimation exceeds a preset threshold volume Vth (see FIGS. 4A to 4E). The secondary determination of the vent passage 37 will be described later in detail.

The tertiary determination unit 75 has a function of performing a tertiary determination of whether there is a minute leak in the vent passage 37, based on whether the vent passage pressure Pvt at the end of the blockage diagnosis period reaches a critical differential pressure Pcrt to the atmospheric pressure Patm (see FIGS. 4A to 4E, details will be described below). The tertiary determination of the vent passage 37 will be described later in detail.

The quaternary determination unit 77 identifies influence of fuel vapor on an accuracy of blockage diagnosis based on information on atmospheric pressure Patm and ambient air temperature To and then performs a quaternary determination of the fuel vapor, based on whether the identified influence of fuel vapor on the accuracy of the blockage diagnosis exceeds a preset influence threshold value. The quaternary determination of the fuel vapor will be described later in detail.

The flow rate controller 69 has a function of sending an open command for opening the seal valve 41 and sending a close command for causing the switching valve 53 to switch to an atmosphere close position, for example, during a time when the internal combustion engine is not running.

[Operation of Blockage Diagnosis Device 11 According to Embodiment of the Present Invention]

Next, the operation performed by the blockage diagnosis device 11 according to the embodiment of the present invention will be described with reference to FIG. 3. FIG. 3 is a flowchart showing the blockage diagnosis process performed by the blockage diagnosis device 11 according to the embodiment of the present invention. Note that in an example shown in FIG. 3, on the assumption that the ignition switch 30 is turned off and the ECU 17 is in a sleep mode, the blockage diagnosis process is executed. Here, the term "sleep mode" refers to an operation mode of the ECU 17 in which the operation of the ECU 17 is limited to determination as to whether the elapsed time since the ignition switch 30 has been turned off exceeds a predetermined time in order to save power consumption. In addition, during the blockage diagnosis process, the seal valve 41 is in an opened state (see a reference sign 41b indicating the seal valve 41 is in an opened state in FIG. 1A), and the switching valve 53 is at a shut-off position to shut off the canister 15 from the atmosphere.

In the blockage diagnosis process, presence or absence of blockage of the vent passage 37 is diagnosed. As a form of blockage of the vent passage 37, blockage abnormality of the seal valve 41, clogging of foreign matter in the vent passage 37, blockage abnormality of a float valve 37a11, and the like are assumed, for example. If the vent passage 37 is blocked on the assumption that sucking operation of the negative pressure pump 51 is constant due to a constant flow rate control, the volume of the sealed space to which the negative pressure is applied is small, as compared with a case where the vent passage 37 is not blocked. Therefore, in the present blockage diagnosis process, the sealed spatial volume is estimated based on time required for the vent passage pressure Pvt being reduced in association with the operation of the negative pressure pump 51 and a emission speed of fluid (details of which will be described later), and subsequently the presence or absence of blockage of the vent passage 37 is diagnosed based on whether the estimated volume of the sealed space exceeds the threshold volume Vth (see FIGS. 4A to 4E).

In step11 as shown in FIG. 3, the diagnosis unit 67 of the ECU 17 calculates the first estimation volume V1 of the sealed space (closed space of the fuel vapor sealing system). Here, the first estimation volume V1 is a volume of the sealed space that is estimated, at an primary-stage in a first period of time (a period of time from time t12 to time t13 in FIG. 4A, for example) of the blockage diagnosis period (a period of time from time t12 to time t16 in FIG. 4A, for example), based on a first time length (|t12−t31|), (see FIG. 4A, for example) required to cause fluid in the sealed space in which the vent passage pressure Pvt is reset to the atmospheric pressure Patm to be sucked using the negative pressure pump 51 so as to be reduced by the first differential pressure (a primary-stage differential pressure Ppr=P(t12)−P(t13): see FIG. 4A, for example), and the reference emission speed Qref. The first estimation volume V1 corresponds to "first estimation volume" of the present invention. Note that the calculation procedure of the first estimation volume will be described later in detail. Further, the reference emission speed Qref is an estimation value of a flow speed [L/sec] when the vent passage 37 is reduced in pressure using the negative pressure pump 51. As the reference emission speed Qref, a emission speed may be used that is measured when the fluid in the vent passage 37 is suctioned through the reference orifice 59 using the negative pressure pump 51. Furthermore, the reference emission speed Qref has a positive linear correlation with the internal pressure Pvt of the vent passage 37 (that may be abbreviated as "vent passage pressure Pvt" hereinafter). Therefore, as the reference emission speed Qref, a value corrected according to a change in the vent passage pressure Pvt may be appropriately employed.

Figure 4A:
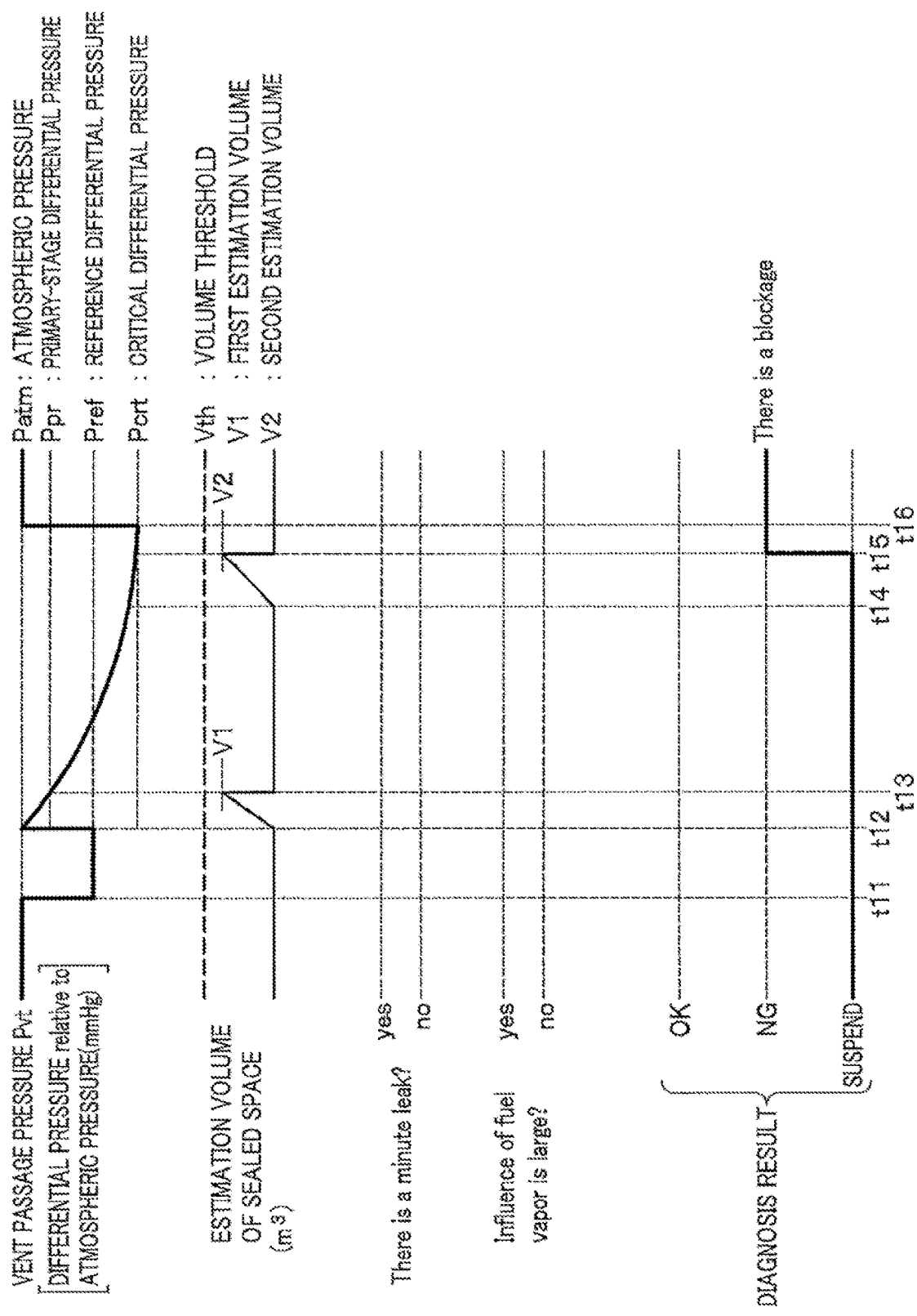
FIG. 4A is time chart showing temporal transitions of respective values relative to the blockage diagnosis in case1 when an internal pressure of a vent passage having blockage abnormality is reduced using a negative pressure pump.

In step S12, the diagnosis unit 67 of the ECU 17 performs the primary determination of the vent passage 37, based on whether the first estimation volume V1 calculated in step S11 exceeds the preset threshold volume Vth (see FIG. 4A, for example).

If, as a result of the primary determination in step S12, it is determined the first estimation volume V1 exceeds the threshold volume Vth ("Yes" in step12), the diagnosis unit 67 of the ECU 17 causes a process flow to jump to step17 (diagnosis result: there is no blockage).

However, if, as the result of the primary determination in step S12, it is determined the first estimation volume V1 doesn't exceed the threshold volume Vth ("No" in step12), the diagnosis unit 67 of the ECU 17 determines that there is a blockage to cause the process flow to proceed to the next step37.

In step S13, the diagnosis unit 67 of the ECU 17 calculates the second estimation volume V2 of the sealed space. Here, the second estimation volume V2 is the volume of the sealed space to be estimated, in the later-stage second period (period of time from time t14 to time t15 FIG. 4A, for example) of the blockage diagnosis period (period of time from time t12 to time t16 in FIG. 4A, for example), based on a second time length (|t14−t15|), required to cause the fluid in the sealed space to be sucked using the negative pressure pump 51 so as to be reduced by a second differential pressure (a later-stage differential pressure=P(t14)−P (t15): see FIG. 4A, for example), and the reference emission speed Qref. The second estimation volume V2 corresponds to "a second estimation volume" of the present invention. Note that, when diagnosed as blocked, the negative pressure pump 51 continues to suck the fluid in the sealed space including the vent passage 37. The calculation procedure of the second estimation volume V2 will be described later in detail.

In step S14, the diagnosis unit 67 of the ECU 17 performs the secondary determination of the vent passage 37, based on whether the second estimation volume V2 calculated in step S13 exceeds the threshold volume Vth (see FIG. 4A, for example).

If, as a result of the secondary determination in step S14, it is determined the second estimation volume V1 exceeds the threshold volume Vth ("Yes" in step S14), the diagnosis unit 67 of the ECU 17 determines that the there is still a blockage to cause the process flow to proceed to the next step S15.

On the other hand, if, as a result of the secondary determination in step S12, it is determined the second estimation volume V2 doesn't exceed the threshold volume Vth ("No" in step S14), the diagnosis unit 67 of the ECU 17 causes the process flow to jump to step S19 (diagnosis result: there is a blockage).

In step S15, the diagnosis unit 67 of the ECU 17 performs a tertiary determination of whether there is a minute leak in the ventilation fuel 37, based on whether the vent passage pressure Pvt has reached the critical differential pressure Pcrt relative to the atmospheric pressure Patm (see FIG. 4A, for example) at the end of the blockage diagnosis period (see time t16 in FIG. 4A, for example).

If, as a result of the tertiary determination in step S15, it is determined the vent passage pressure Pvt has reached the critical differential pressure Pcrt ("Yes" in step S15) at the end of the blockage diagnosis period, the diagnosis unit 67 of the ECU 17 determines that there is no minute leak to cause the process flow to proceed to the step S17 (diagnosis result: there is no blockage).

On the other hand, if, as a result of the tertiary determination in step S12, it is determined the vent passage pressure Pvt hasn't reached the critical differential pressure Pcrt ("No" in step S15) at the end of the blockage diagnosis period, the diagnosis unit 67 of the ECU 17 determines that there is a minute leak to cause the process flow to proceed to the step16.

In step S16, the diagnosis unit 67 of the ECU 17 identifies influence of the fuel vapor on the accuracy of the blockage diagnosis, based on information on the atmospheric pressure Patm and the ambient air temperature To, and then performs a quaternary determination of the fuel vapor, based on whether the identified influence on the accuracy of the blockage diagnosis exceeds the preset influence threshold value, that is, whether influence of the fuel vapor on the accuracy of the blockage diagnosis is large.

If, as a result of the quaternary determination in step S16, it is determined the influence of the fuel vapor on the accuracy of the blockage diagnosis is large ("Yes" in step S16), the diagnosis unit 67 of the ECU 17 causes the process flow process to jump to step S18 (diagnosis result: diagnosis is suspended).

On the other hand, if, as a result of the quaternary determination in step S16, it is determined the influence of the fuel vapor on the accuracy of the blockage diagnosis is not large ("No" in step S16), the diagnosis unit 67 of the ECU 17 causes the process flow to jump to step S18 (diagnosis result: there is a blockage).

In step S17, the diagnosis unit 67 of the ECU 17 determines that there is no blockage of the vent passage 37 to end the process flow.

In step S18, the diagnosis unit 67 of the ECU 17 suspends the determination of the presence or absence of blockage of the vent passage 37, to end the process flow.

In step S18, the diagnosis unit 67 of the ECU 17 determines that there is a blockage of the vent passage 37, to end the process flow.

[Chronological Operation of Blockage Diagnosis Device 11 According to Embodiment of the Present Invention]

Figure 4D:
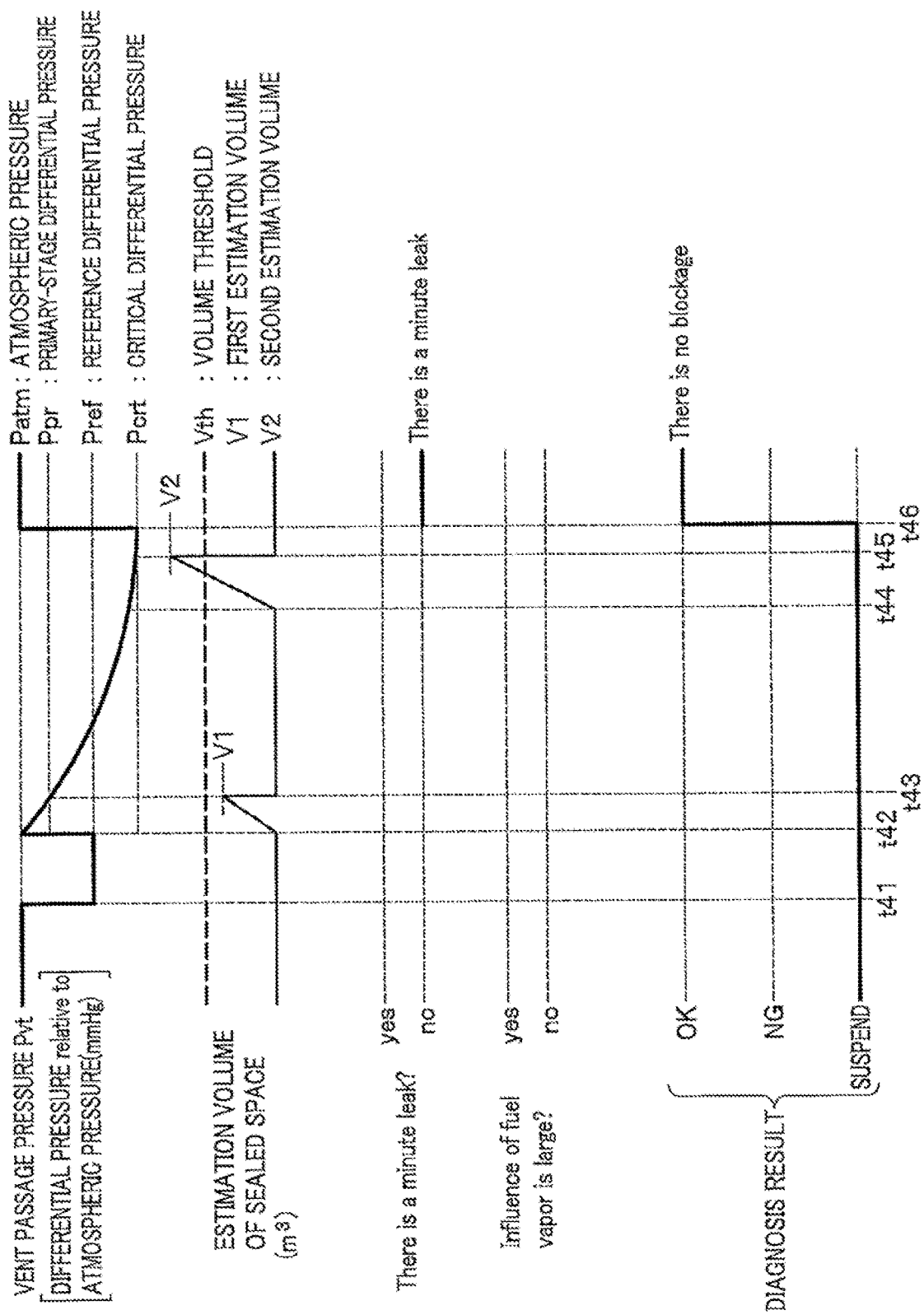
FIG. 4D is time chart showing the temporal transitions of respective values relative to the blockage diagnosis in case4 when the internal pressure of the vent passage in a normal state having no blockage abnormality is reduced using the negative pressure pump.
Figure 4E:
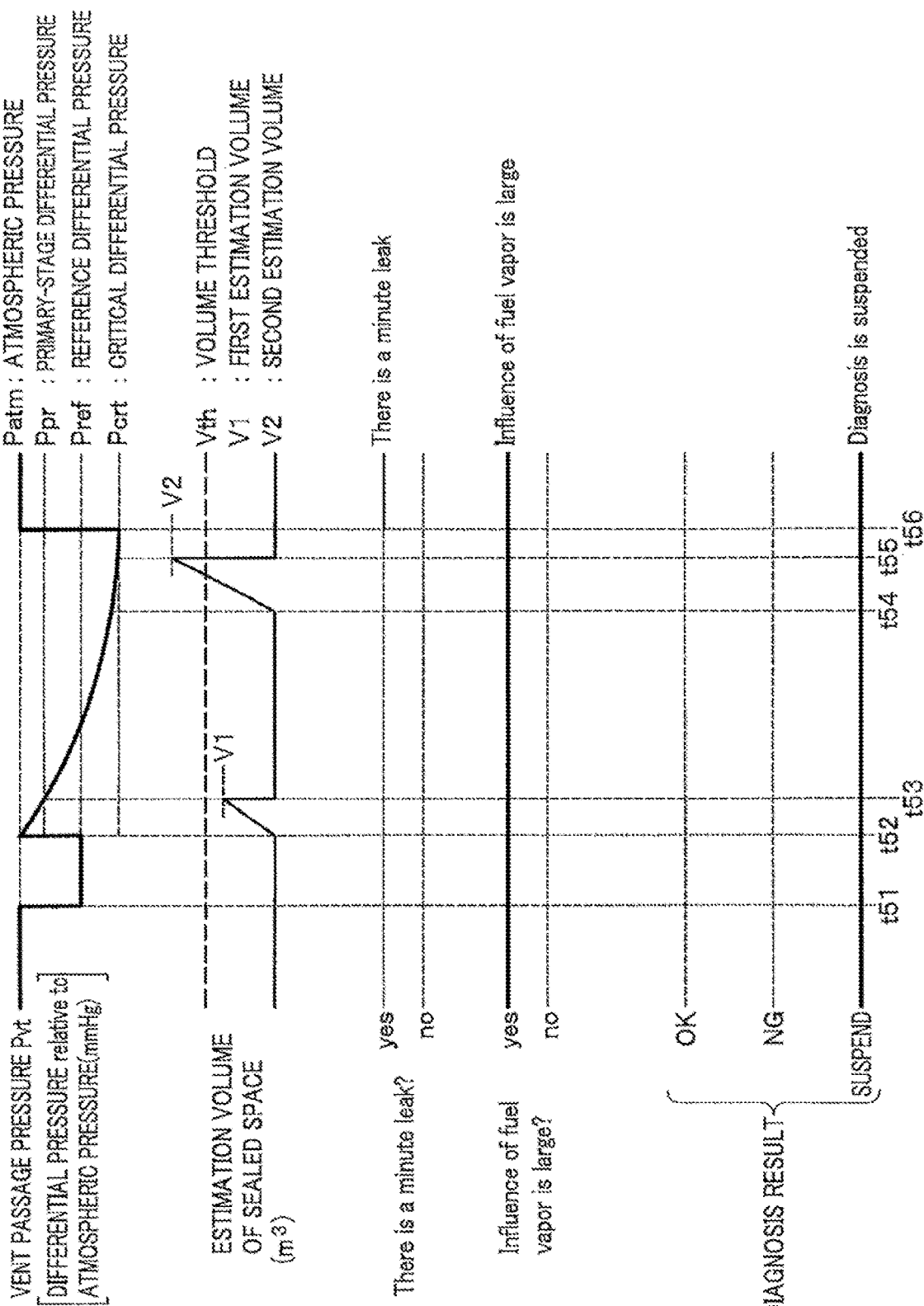
FIG. 4E is time chart showing a temporal transition of respective values of a blockage diagnosis in case5 when the internal pressure of a vent passage in a state that it is not clear whether the blockage abnormality has occurred is reduced using the negative pressure pump.

Next, the chronological operation performed by the blockage diagnosis device 11 according to the embodiment of the present invention will be described in detail with reference to FIGS. 4A to 4E. FIG. 4A and FIG. 4B are time charts showing temporal transitions of respective values relating to the blockage diagnosis performed when the vent passage pressure Pvt with a blockage abnormality is reduced using the negative pressure pump 51. FIGS. 4C and 4D are time charts showing the temporal transitions of the respective values relating to the blockage diagnosis performed when the vent passage 37 that is in a normal state in which no blockage abnormality has occurred is reduced in the pressure Pvt using the negative pressure pump 51. FIG. 4E is time chart showing the temporal transition of respective values according to the blockage diagnosis performed when the vent passage pressure Pvt in a state that it is not clear whether blockage abnormality has occurred is reduced using the negative pressure pump 51.

[Case1 (Diagnosis Result: There is a Blockage)]

First, chronological operation in Case1 (diagnosis result: there is a blockage) will be described with reference to FIG. 4A. The reference emission speed Qref is calculated from the times t11 to t12 shown in FIG. 4A. In this calculation, the switching valve 53 of the diagnosis module 49 is turned off so as to cause the negative pressure pump 51 to perform the sucking operation in a state of the canister communicating with the atmosphere (see FIG. 1B). The sucking operation allows the internal pressure sensor 55 to detect the reference differential pressure Pref (see FIG. 4A, for example) that is negative pressure relative to the atmospheric pressure Patm.

The diameter d of the reference orifice 59 is known. Accordingly, the reference emission speed Qref can be calculated using following Equation (1).

$$Qref = \pi d^2/4 * A * \sqrt{-2\Delta P/\rho} \quad (1)$$

where:
π: Circular constant
d: Diameter of reference orifice 59 [m]
A: Flow coefficient
ΔP: Pressure difference [Pa]
ρ: Air density [g/m³]

The flow coefficient A is a coefficient for correcting a theoretical flow to an actual flow. The flow coefficient A can take a variable value according to change in the vent passage pressure Pvt. The pressure difference ΔP is a differential pressure (Patm−Pvt) between the atmospheric pressure Patm and the vent passage pressure Pvt. The air density p is calculated by following Equation (2).

$$\rho = Patm/R * (To + 273.15) \quad (2)$$

where:
Patm: Atmospheric pressure [Pa]
R: Gas constant of dry air (=2.87)
To: Ambient air temperature [° C.]
273.15: Conversion value for converting Celsius temperature to absolute temperature.

As described above, the reference emission speed Qref of fluid present in the vent passage 37 can be calculated by using Equations (1) and (2).

From time t12 to time t16 (blockage diagnosis period) shown in FIG. 4A, the blockage diagnosis processing is performed. In this blockage diagnosis processing, the switching valve 53 of the diagnosis module 49 is turned on so as to cause the negative pressure pump 51 to perform sucking operation with the canister being shut off from the atmosphere (see FIG. 1C). This sucking operation allows the vent passage pressure Pvt that is a value detected by the internal pressure sensor 55 to gradually decrease on a downward trend up to be less than the critical differential pressure Pcrt that is negative pressure relative to the atmospheric pressure Patm.

During the first period of time from time t12 to time t13 of a period of time from time t12 to time t16 (blockage diagnosis period), the first estimation volume V1 is calculated using following Equation (3), based on the first time length Δt1 (=|t12−t13|) required to cause the fluid in the sealed space in which the vent passage pressure Pvt is reset to the atmospheric pressure Patm to be sucked using the negative pressure pump 51 so as to be reduced by the primary-stage differential pressure Ppr (=P(t12)−P(t13): see FIG. 4A), and the reference emission speed Qref.

$$V1=(Patm/Ppr)*Qref*\Delta t1 \quad (3)$$

where:
V1: First estimation volume [m³]
Patm: Atmospheric pressure [Pa]
Ppr: Primary differential pressure=P(t12)−P(t13) [Pa]
Qref: Reference emission speed [L/sec]
Δt1: First time length=|t12−t13|[sec]

During the second period of time from time t14 to time t15 of the period of time from time t12 to time t16 (blockage diagnosis period), the second estimation volume V2 is calculated using following Equation (4), based on the second time length Δt2 (=|14−t15|) required to cause the fluid in the sealed space to be sucked using the negative pressure pump 51 so as to be reduced by the later-stage differential pressure Pls (=P(t14)−P(t14): see $$V2=(Patm/Pls)*Qref*\Delta t2 \quad (4)$$

where:
V2: Second estimation volume [m³]
Patm: Atmospheric pressure [Pa]
Pls: Later-stage differential pressure value=P(t12)−P(t13) [Pa]
Qref: Reference emission speed [L/Sec]
Δt2: Second time length=|t12−t13|[sec]

The threshold volume Vth shown in FIG. 4A is the value to be referred in performing the primary/secondary determination of the vent passage 37, based on the estimation value of the sealed spatial volume. In the blockage diagnosis device 11 according to the embodiment of the present invention, the specification of the sealed space is previously set in a design stage. The theoretical value of the sealed spatial volume obtained using this design specification may be employed as the threshold volume Vth. Further, the value obtained through simulation or experiment may be also employed as the threshold volume Vth. Furthermore, instead of the theoretical value or the value obtained through the simulation or experiment, a value obtained by adding a margin in consideration of an error to one of these values may also employed as the threshold volume Vth.

The first and second estimation volumes V1 and V2 are compared with the threshold volume Vth in magnitude to execute the primary and secondary determination of the vent passage 37. If there is no blockage in the vent passage 37, the time lengths Δt1, Δt2 required for reducing the vent passage pressure Pvt by a predetermined differential pressure are relatively long. Therefore, the flow amount of the fluid in association with the pressure reduction, that is, the first and second estimation volumes V1, V2 are relatively large. In such a case, the first and second estimation volumes V1, V2 exceed the threshold volume Vth. Accordingly, the primary and secondary determination of the vent passage 37, for which it is determined "there is no blockage", is performed.

On the other hand, if there is a blockage in the vent passage 37, the time lengths Δt1, Δt2 required for reducing the vent passage pressure Pvt by a predetermined differential pressure are relatively short. Therefore, the flow amount of the fluid in association with the pressure reduction, that is, the first and second estimation volumes V1, V2 are relatively small. In such a case, the first and second estimation volumes V1 and V2 are less than the threshold volume Vth.

Accordingly, the primary and secondary determination of the vent passage 37, in which it is determined "there is a blockage" is performed.

In Case1, in both of the primary determination of the vent passage 37 performed based on the first estimation volume V1 and the secondary determination of the vent passage 37 performed based on the second estimation volume V2, it is determined "there is a blockage" is made. As a result, Case1 has a diagnosis on "there is a blockage."

Case1 described above corresponds to a process flow in FIG. 3, that is, from ("No" in step S12) to ("No" in step S14) to (step S19: there is a blockage of the vent passage 37). Case1 has a diagnosis on "there is a blockage" at time t15 in FIG. 4A.

Second Embodiment (Diagnosis Result: There is a Blockage)

Next, the chronological operation in Case2 (diagnosis result: there is a blockage) will be described with reference to FIG. 4B. The chronological operation in Case1 and the chronological operation in Case2 are partly in common with each other. Accordingly, Case2 will be described by focusing on the difference between Case1 and Case2.

During a period of time from time 21 to time 22 shown in FIG. 4B, the reference emission speed Qref is calculated as in Case1.

During a period of time from time t22 to time t26 (a blockage diagnosis period) shown in FIG. 4B, the blockage diagnosis processing is performed as in Case1.

During a first period of time from time t22 to time t23 of a period of time from time t22 to time t26 (when diagnosed as blocked), the first estimation volume V1 is calculated using the same procedure as in Case1. As a result of the primary determination of the vent passage 37 performed based on the first estimation volume V1, it is determined "there is a blockage" as in Case1.

During a second period of time from time t24 to time t25 of the period of time from time t22 to time t26 (when diagnosed as blocked), the second estimation volume V2 is calculated using the same procedure as in Case2. As a result of the secondary determination of the vent passage 37 performed based on the second estimation volume V2, it is determined "there is no blockage" unlike in Case1.

Figure 5A:
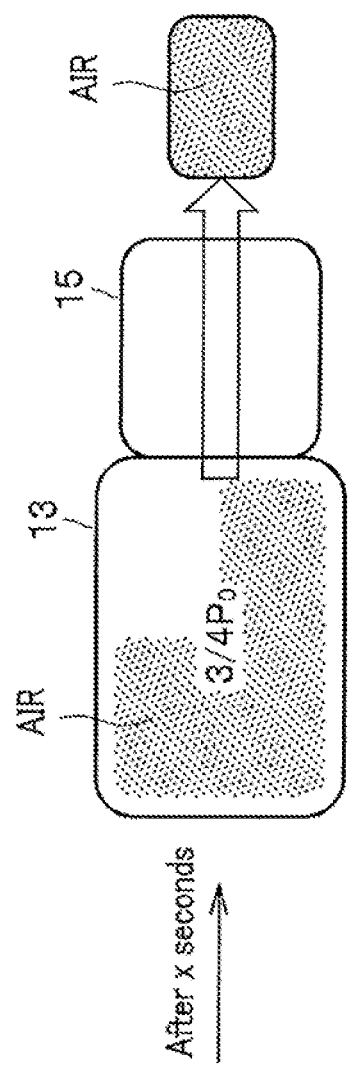
FIG. 5A is an illustration conceptually showing a mechanism by which the internal pressure is changed when a sealed space is reduced in pressure for a predetermined time using the negative pressure pump, in a case where fuel vapor does not exist in the fuel tank.
Figure 5C:
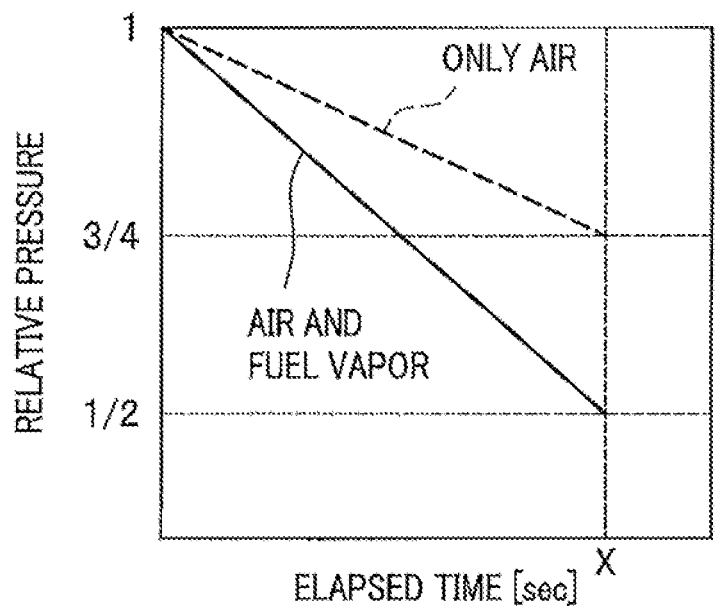
FIG. 5C is a chart contrasting one change over time characteristics of the internal pressure in a case where the fuel vapor exists in the fuel tank with another change over time characteristics of the internal pressure in a case where the fuel vapor does not exist in the fuel tank.

Here, a mechanism causing a case of the primary determination result being "there is a blockage" but the secondary determination result being "there is no blockage" will be described with reference to FIGS. 5A and 5B. FIG. 5A is an illustration conceptually showing a mechanism that causes a change in the vent passage pressure Pvt when a sealed space is reduced in pressure for a predetermined time using the negative pressure pump 51 in a case where fuel vapor does not exist in the fuel tank 13. FIG. 5B is an illustration conceptually showing the mechanism that causes a change in the vent passage pressure Pvt when a sealed space is reduced in pressure for a predetermined time using the negative pressure pump 51 in a case where fuel vapor exists in the fuel tank 13. FIG. 5C is an illustration contrasting one change over time characteristics of the vent passage pressure Pvt in a case where the fuel vapor exists in the fuel tank 13, with another change over time characteristics of the vent passage pressure Pvt in a case where the fuel vapor does not exist in the fuel tank 13.

Now, a case is assumed in which the fuel vapor doesn't exist in the fuel tank 13 (fuel tank 13 is filled with air). The vent passage pressure Pvt is assumed to be "Po" As shown in FIG. 5A. In such a state, the sealed space (including the fuel tank 13, the vent passage 37, and the canister 15) is reduced in pressure using the negative pressure pump 51 only for a predetermined time (x seconds). In this case, after x seconds, As shown in FIG. 5A, a predetermined volume of air is discharged out of the sealed space. This is because the negative pressure pump 51 is a fixed volume pump. As a result, the vent passage pressure Pvt is reduced to "¾ Po" (see FIG. 5C). The fuel vapor is not absorbed in the canister 15. This is because the fuel vapor does not exist in the fluid discharged to the outside of the sealed space through the canister 15 in association with the pressure reduction of the sealed space.

Now, a case is assumed in which the fuel vapor exists in the fuel tank 13 (the fuel tank 13 is filled with a mixed fluid of air and fuel vapor). As shown in FIG. 5B, the vent passage pressure Pvt is assumed to be "Po" as described above. In this state, the sealed space is reduced in pressure using the negative pressure pump 51 only for a predetermined time (x seconds). In this case, after x seconds, As shown in FIG. 5B, a predetermined volume of air is discharged out of the sealed space. This is because the negative pressure pump 51 is the fixed volume pump. In addition, the fuel vapor is absorbed to the canister 15 to be condensed (volume is reduced). This is because the fuel vapor exists in the fluid to be discharged out of the sealed space through the canister 15 in association with the reduction in the pressure of the sealed space. As a result, the vent passage pressure Pvt is reduced to "½ Po" (see FIG. 5C).

In short, a pressure reducing speed of the vent passage pressure Pvt in a case where the fuel vapor exists in the fuel tank 13 is larger (see FIG. 5C) than that in a case where the fuel vapor does not exist in the fuel tank 13. The pressure reducing speed of the vent passage pressure Pvt increases as the concentration of the fuel vapor increases. Therefore, a relatively small value is calculated as the first estimation volume V1. In such a case, the first estimation volume V1 is less than the threshold volume Vth. Consequently, in a case where the determination of "there is no blockage" should be given, there is a risk that an erroneous determination of "there is a blockage" may be given depending on a concentration of the fuel vapor in the sealed space and a capacity of the fuel vapor absorbed in the canister 15.

However, it has been revealed according to the study by the inventors that a case of having the erroneous determination is limited to the primary-stage (the first period of time) of the blockage diagnosis period during which the blockage diagnosis is made. This is because, there is a limit to the capacity of the fuel vapor absorbed in the canister 15, so that, when the adsorption capacity is saturated, the canister 15 no longer absorbs the fuel vapor. This is also because, if the concentration of the fuel vapor in the fuel tank 13 is originally high, the capacity of the fuel vapor absorbed in the canister 15 is close to saturation.

In short, it has been revealed that there is a case in which, even if the determination of "there is a blockage" is given in the primary determination during the primary-stage (the first period of time) of the blockage diagnosis period, it is possible to make a final diagnosis on "there is no blockage" of the vent passage 37, if the determination of "there is no blockage" is given in the secondary determination of the later-stage (the second period of time).

Referring back to FIG. 4B for further description, a determination of "there is a minute leak" is given after time t26. Here, determination of whether there is a minute leak is performed by the tertiary determination unit 75 in step S15 shown in FIG. 3. The tertiary determination part 75 determines the tertiary determination of the vent passage 37 based on whether the vent passage pressure Pvt at the end point of the blockage diagnosis period (time t26 shown in FIG. 4B) has reached the critical pressure difference Pcrt (see FIG. 4B) relative to the atmospheric pressure Patm. Here, the critical differential pressure Pcrt is set in consideration of a value to which the vent passage pressure Pvt cannot to reach, if there is a minute leak hole having a preset diameter. The diameter of the minute leak hole is much smaller than the diameter d of the reference orifice 59. In the tertiary determination of the vent passage 37, if the vent passage pressure Pvt at the end point of the blockage diagnosis period reaches the critical differential pressure Pcrt ("Yes" in step S15), the determination of "there is no minute leak" is given. However, if the vent passage pressure Pvt at the end point of the blockage diagnosis period does not reach the critical differential pressure Pcrt ("No" in step S15), the determination of "there is a minute leak" is given.

During the entire period of time from time t21 to time t26 shown in FIG. 4B, the determination of "the influence of the fuel vapor is small" is given. Here, the determination of the magnitude of the influence of the fuel vapor is performed by the quaternary determination unit 77 in step S16 shown in FIG. 3. The quaternary determination unit 77 identifies the degree of influence of the fuel vapor on the accuracy of the blockage diagnosis, based on the information on the atmospheric pressure Patm and the ambient air temperature To, and then performs the quaternary determination of the vent passage 37, based on whether the degree of the identified influence of the fuel vapor on the accuracy of blockage diagnosis exceeds the preset threshold of the influence degree.

Figure 6:
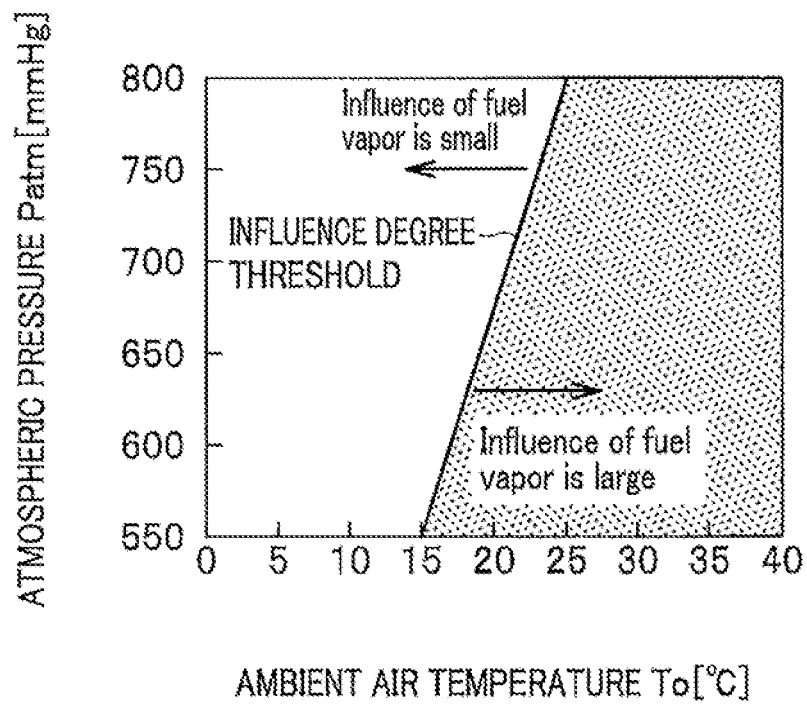
FIG. 6 is a threshold chart showing magnitude of influence of the fuel vapor on an accuracy of the blockage diagnosis together with changes in the atmospheric pressure and the ambient air temperature.

Hereinafter, the relationship between the magnitude of the influence of the fuel vapor on the accuracy of the blockage diagnosis and the information on the atmospheric pressure Patm and the ambient air temperature To, will be described with reference to FIG. 6. FIG. 6 is a threshold chart showing the magnitude of the influence of the fuel vapor on the accuracy of the blockage diagnosis is represented according to changes in atmospheric pressure Patm/ambient air temperature To.

As shown in FIG. 6, the magnitude of the influence of the fuel vapor on the accuracy of the blockage diagnosis is strongly correlated with change in the external environment such as the atmospheric pressure Patm and the ambient air temperature To. Specifically, the lower the atmospheric pressure Patm is, the greater the influence of fuel vapor on the accuracy of the blockage diagnosis is. Also, the higher the ambient air temperature To is, the larger the influence of the fuel vapor on the accuracy of the blockage diagnosis is. Such relationships can be represented using a concept called "influence degree threshold" as shown in FIG. 6.

In the quaternary determination of the vent passage 37, if the influence degree of the fuel vapor on the accuracy of the blockage diagnosis exceeds the influence degree threshold ("Yes" in step S16), it is determined that the influence of the fuel vapor on the accuracy of blockage diagnosis accuracy is large. On the other hand, if the influence degree on the blockage diagnosis accuracy does not exceed the influence degree threshold ("No" in step S16), it is determined the influence of the fuel vapor on the blockage diagnosis accuracy is small.

Case2 described above corresponds to a process flow in FIG. 3, that is, from ("No" in step S12) to ("Yes" in step S14) to ("No" in step S15) to ("No" in step S16) to (step S19: there is a blockage of the vent passage 37). In Case2, a diagnosis on "there is a blockage" is given at time t26 shown in FIG. 4B.

[Case3 (Diagnosis Result: There is No Blockage)]

Next, chronological operation in Case3 (diagnosis result: there is no blockage) will be described with reference to FIG. 4C. In the chronological operation in Case1 and the chronological operation in Case3 are partly in common with each other. Accordingly, Case3 will be described by focusing on the difference between the Case1 and Case3.

During a period of time from time t31 to time t32 shown in FIG. 4C, the reference emission speed Qref is calculated as in Case1.

During a period of time from time t32 to time t34 (blockage diagnosis period) shown in FIG. 4C, the blockage diagnosis processing is performed as in Case1.

During a first period of time from time t32 to time t33 of the period of time from time t32 to time t34 (blockage diagnosis period), the first estimation volume V1 is calculated using the same procedure as in Case1. As a result of the primary determination of the vent passage 37 performed based on the first estimation volume V1, it is determined "there is no blockage" unlike in Case1.

Case3 described above corresponds to a process flow in FIG. 3, that is, from ("Yes" in step S12) to (step S17: there is no blockage of the vent passage 37). In Case3, at time t33 shown in FIG. 4C, it is determined "there is no blockage."

[Case4 (Diagnosis Result: There is No Blockage)]

Next, chronological operation in Case4 (diagnosis result: there is no Blockage.) will be described with reference to FIG. 4D. The chronological operations in Case2 and Case4 are partly common with each other. Accordingly, Case4 will be described by focusing on the difference between Case2 and Case4.

During a period of time from time t41 to time t42 shown in FIG. 4D, the reference emission speed Qref is calculated in the same manner as in Case2.

During a first period of time from time t42 to time t46 (blockage diagnosis period) shown in FIG. 4D, the blockage diagnosis processing is performed as in Case2.

During a first period of time from time t42 to time t43 of the period of time from time t42 to time t46 (when diagnosed as blocked), the first estimation volume V1 is calculated in the same procedure as in Case2. As a result of the primary determination of the vent passage 37 performed based on the first estimation volume V1, it is determined "there is a blockage" as in Case2.

During a second period of time from time t44 to time t45 of the period of time from time t42 to time t46 (when diagnosed as blocked), the second estimation volume V2 is calculated in the same procedure as in Case2. As a result of the secondary determination of the vent passage 37 performed based on the second estimation volume V2, it is determined "there is no blockage" as in Case2.

After time t46, it is determined "there is no minute leak" unlike in Case2.

Case4 described above corresponds to a process flow in FIG. 3, that is, from ("No" in step S12) to ("Yes" in step S14) to ("Yes" in step S15) to (step S17: There is no blockage of the vent passage 37). In Case4, at time t46 shown in FIG. 4D, it is determined "there is no blockage." That is, Case4 corresponds to a case in which, even if the determination of "there is a blockage" is given in the primary determination during the primary-stage (the first period of time) of the blockage diagnosis period, it is possible to make a final diagnosis on "there is no blockage" of the vent passage 37, if the determination of "there is no blockage" is given in the secondary determination of the later-stage of the blockage diagnosis period (the second period of time). Case4 can occur, for example, when low boiling point fuel is used

[Case5 (Diagnosis Result: Pending)]

Next, chronological operation in Case5 (diagnosis result: pending) will be described with reference to FIG. 4E. The chronological operation in Case2 and the chronological operation in Case5 are partly common with each other. Accordingly, Case 5 will be described by focusing on the difference between Case2 and Case5.

During a period of time from time t51 to time t52 shown in FIG. 4E, a reference emission speed Qref is calculated in the same manner as in Case2.

During a period of time from time t52 to time t56 (blockage diagnosis period) shown in FIG. 4E, blockage diagnosis process is performed as in Case2.

During a first period of time from time t54 to time t55 of the period of time from time t52 to time t56 (blockage diagnosis period), a first estimation volume V1 is calculated using the same procedure as in Case2. As a result of the primary determination of the vent passage 37 performed based on the first estimation volume V1, it is determined "there is a blockage" as in Case2.

During a second period of time from time t54 to time t55 of the period of time from time t52 to time t56 (blockage diagnosis period), a second estimation volume V2 is calculated using the same procedure as in Case2. As a result of the secondary determination of the vent passage 37 performed based on the second estimation volume V2, it is determined "there is no blockage" as in Case2.

After time t56, it is determined "there is a minute leak" as in Case2. Further, during an entire period of time from time t51 to time t56, it is determined "the influence of the fuel vapor is large."

Case5 as described above corresponds to a process flow in FIG. 3, that is, from ("No" in step S12) to ("Yes" in step S14) to ("No" in step S15) to ("Yes" in step S16) to (step S18: the blockage diagnosis on the vent passage 37 is pending). In Case5, it is determined "pending" during the entire period of time from time t51 to time t56. Case5 may occur, for example, in a case where there is a minute leak and the low boiling point fuel is used, or in a case where there is a minute leak and there is a blockage of the vent passage 37.

[Advantageous Effects of Blockage Diagnosis Device 11]

Next, a description will be given of advantageous effects of the blockage diagnosis device 11 according to the embodiment of the present invention.

The blockage diagnosis device 11 according to a first aspect (corresponding to claim 1) is assumed to be a blockage diagnosis device that is applied to a fuel tank system including the fuel tank 13 for containing fuel, the canister 15 for adsorbing fuel vapor generated in the internal space of the fuel tank 13, and the vent passage 37 communicating between the internal space of the tank 13 and the canister 15, to perform blockage diagnosis on the vent passage 37. The blockage diagnosis device 11 according to the first aspect includes the information acquiring unit 65 that acquires the information on the internal pressure of the vent passage 37, the controller (flow rate controller) 69 that performs flow rate control of the fluid in the vent passage 37 by the operation of the negative pressure pump (negative pressure source) 51, the diagnosis unit (blockage diagnosis device) 67 that performs blockage diagnosis on the vent passage 37, based on the change over time in the internal pressure of the vent passage 37 in association with the operation of the negative pressure pump 51.

The blockage diagnosis period (see the period of time from time t12 to time t16 in FIG. 4A, for example), during which the blockage diagnosis on the vent passage 37 is performed, includes the first period of time (see the period of time from time t12 to time t13 in FIG. 4A, for example) that starts at an operation starting time of the negative pressure pump 51 or after the lapse of the first predetermined time (for example, zero in the cases of FIGS. 4A to 4E) relative to the operation starting time and the second period of time (see the period of time from time t14 to time t15 in FIG. 4A, for example) that ends at an operation finishing time of the negative pressure pump 51 or at a time going back from the operation finishing time by the second predetermined time (see |t15−t16| in FIG. 4A, for example), wherein the first and second periods of time are shifted from each other so as not to be overlapped with each other. The diagnosis unit 67 includes: the primary determination unit 71 that estimates in the first period of time the sealed spatial volume of the fuel vapor sealing system including the vent passage 37 and the fuel tank 13 based on the time length (see |t12−t13| in FIG. 4A, for example) required for reducing the internal pressure Pvt of the vent passage 37 by the first differential pressure (primary-stage differential pressure: Ppr) by the operation of the negative pressure pump 51, and the reference emission speed Qref of the fluid, and then performs primary determination of the vent passage 37, based on whether the estimated first estimation volume V1 exceeds the preset threshold volume Vth; and the secondary determination unit 73 that estimates in the second period of time the sealed spatial volume based on the time length (see |t14−t15| in FIG. 4A, for example) required for reducing the internal pressure Pvt of the vent passage 37 by the second differential pressure (late-stage differential pressure=P(t14)−P(t15): see FIG. 4A, for example) by the operation of the negative pressure pump 51, and the reference emission speed Qref of the fluid, and then performs secondary determination of the vent passage 37, based on whether the estimated second estimation volume V2 exceeds the threshold volume Vth.

In the blockage diagnosis device 11 according to the first aspect, if the first estimation volume V1 is less than the threshold volume Vth the primary determination unit 71 of the diagnosis unit 67 makes a primary determination indicating that the vent passage 37 is blocked. If the second estimation volume V2 is less than the threshold volume Vth, the secondary determination unit 73 makes a secondary determination indicating that the vent passage 37 is blocked. If the primary determination unit 71 makes the primary determination indicating that vent passage 37 is blocked, and the secondary determination unit 73 of the diagnosis unit 67 makes the secondary determination indicating that the vent passage 37 is blocked, the diagnosis unit 67 determines that the vent passage 37 is blocked.

According to the blockage diagnosis device 11 of the first aspect, the sealed spatial volume is estimated in each of the first period of time and the second period of time, which are shifted from each other so as not to be overlapped with each other, of the blockage diagnosis period in which the blockage diagnosis on the vent passage 37 is made, and then the primary determination and the secondary determination are performed using the estimated result. Based on these determination results, presence or absence of a blockage of the vent passage 37 is diagnosed, so that, even if the estimated value of the sealed spatial volume varies significantly depending on disturbance such as the amount of the fuel remaining in the fuel tank 13, it is possible to perform the blockage diagnosis on the vent passage 37 with high accuracy, based on the estimated value of the sealed spatial volume.

Incidentally, if it is determined "there is a blockage" in the primary determination, and it is determined "there is no blockage" in the secondary determination, the reason of causing such different determination results may be identified to solve a problem of a proper blockage diagnosis on the vent passage 37.

The blockage diagnosis device 11 according to a second aspect (corresponding to claim 2) is based on the blockage diagnosis device 11 of the first aspect. The diagnosis unit 67 further includes the tertiary determination unit that performs the tertiary determination of the vent passage 37, based on whether the internal pressure Pvt of the vent passage 37 at a finish point of time (see time t27 shown in FIG. 4B, for example,) of the blockage diagnosis period exceeds the preset critical pressure value (critical differential pressure: Pcrt). If the first determination indicating that the vent passage 37 is blocked is made in the first determination unit 71, and the secondary determination indicating that the vent passage 37 is not blocked is made in the secondary determination unit 73, and if the internal pressure Pvt of the vent passage 37 at the finish point of time of the blockage diagnosis period is lower than the critical pressure value Pcrt, the third termination unit 75 of the diagnosis unit 67 makes the tertiary determination indicating that there is a minute leak According to the blockage diagnosis device 11 of the second aspect, if it is determined "there is a blockage" in the primary determination, and it is determined "there is no blockage" in the secondary determination, the tertiary determination indicating that there is a minute leak in the vent passage 37 is made if the internal pressure Pvt of the vent passage 37 at the finish point of time of the blockage diagnosis period is lower than the critical pressure value Pcrt. Accordingly, the reason causing the different determination results (there is a minute leak in the vent passage 37) is identified to improve the accuracy of the blockage diagnosis on the vent passage 37.

The blockage diagnosis device 11 according to a third aspect (corresponding to claim 3) is based on the blockage diagnosis device 11 according to the second aspect. The information acquiring unit 65 further acquires information on atmospheric pressure Patm and ambient air temperature To. The diagnosis unit 67 then further includes the quaternary determination unit 77 that identifies the influence of the fuel vapor on the accuracy of the blockage diagnosis based on the information on the atmospheric pressure Patm and the ambient air temperature To, and that performs the quaternary determination of the fuel vapor based on whether the identified influence of the fuel vapor on the accuracy of the blockage diagnosis exceeds the preset threshold of the influence degree. The quaternary determination unit 77 of the diagnosis unit 67 makes the quaternary determination indicating that the influence of the fuel vapor on the accuracy of the blockage diagnosis is small if the identified influence of the fuel vapor on the accuracy of the blockage diagnosis is lower than the threshold of the influence degree. The diagnosis unit 67 employs the following configuration. That is, if the primary determination unit 71 makes the primary determination indicating that vent passage 37 is blocked, the secondary determination unit 73 makes the secondary determination indicating that the vent passage 37 is not blocked, the tertiary determination unit 75 makes the tertiary determination indicating that there is a minute leak in the vent passage 37, and the quaternary determination unit 77 makes the quaternary determination indicating that the influence of the fuel vapor on the accuracy of the blockage diagnosis is small, the diagnosis unit 67 determines that the vent passage 37 is blocked.

According to the blockage diagnosis device 11 of the third aspect, if it is determined "there is a blockage" in the primary determination, it is determined "there is no blockage" in the secondary determination, and it is determined "there is a minute leak in the vent passage 37" in the tertiary determination, the quaternary determination indicating that the influence of the fuel vapor on the accuracy of the fuel vapor is small is made, if the influence of the fuel vapor on the accuracy of the blockage diagnosis is lower than the threshold of the influence degree. Therefore, identifying the reason of causing the different determination results (there is a minute leak in the vent passage 37/the influence of the fuel vapor is small) improves the accuracy of the blockage diagnosis on the vent passage 37.

According to a fourth aspect (corresponding to claim 4) of the embodiment of the present invention, a blockage diagnosis device 11 is based on the blockage diagnosis device of the third aspect (corresponding to claim 3). The diagnosis unit 67 of the fourth aspect employs the following configuration. That is, if the primary determination unit 71 makes the primary determination indicating that vent passage 37 is blocked, the secondary determination unit 73 of the diagnosis unit 67 makes the secondary determination indicating that the vent passage 37 is not blocked, the tertiary determination unit 73 of the diagnosis unit 67 makes the tertiary determination indicating that there is a minute leak in the vent passage 37, and the quaternary determination unit 77 makes the quaternary determination indicating that the influence of the fuel vapor on the accuracy of the blockage diagnosis is large, the diagnosis unit 67 suspends the blockage diagnosis on the vent passage 37.

According to the blockage diagnosis device 11 of the fourth aspect, if it is determined "there is a blockage" in the primary determination, it is determined "there is no blockage" in the secondary determination, it is determined "there is a minute leak in the vent passage 37" in the tertiary determination, and it is determined "the influence of the fuel vapor on the accuracy of the blockage diagnosis is large" in the quaternary determination, the blockage diagnosis on the vent passage 37 is suspended, so that identifying the reason (there is a minute leak in the vent passage 37/the influence of the fuel vapor is large) causing the different determination results improves the accuracy of the blockage diagnosis on the vent passage 37.

Further, a blockage diagnosis device 11 according to a fifth aspect (corresponding to claim 5) is based on the blockage diagnosis device 11 of any one of the first to fourth aspects. The blockage diagnosis device 11 of the fifth aspect may employ the following configuration. That is, the first period of time has a start time of the operation of the negative pressure pump 51 as a starting time, while the second period of time has an end time of the operation of the negative pressure pump 51 as an ending time.

According to the blockage diagnosis device 11 of the fifth aspect, the first and second periods of time, which are shifted from each other so as not to have an overlapped period includes the starting time and the ending time of the blockage diagnosis period to contribute to improving accuracy in the primary and secondary determination, resulting in further improvement in accuracy of the blockage diagnosis on the vent passage 37.

Other Embodiments

The above-described embodiments are provided as only examples of realizing the present invention, and it should not be construed that the technical scope of the present invention is limited thereto, since various embodiments may be implemented without departing from the gist or main features of this disclosure.

For example, the embodiment according to the present invention has been described with reference to the example in which the seal valve 41 is provided in the vent passage 37, however, the present invention is not limited to this example. The seal valve 41 may be eliminated.

In addition, the embodiment according to the present invention has been described with reference to the example in which the atmospheric pressure sensor 58 is provided, however, the present invention is not limited to this example. The atmospheric pressure sensor 58 may be eliminated. In this case, when the switching valve 53 is switched to the atmosphere communication position to allow the canister 15 to communicate with the atmosphere (see FIG. 1B), the internal pressure sensor 55 detects the atmospheric pressure Patm. Accordingly, the configuration may be employed in which the atmospheric pressure Patm is detected by the internal pressure sensor 55.

Furthermore, while the embodiment of the present invention has been described with reference to the example in which the blockage diagnosis device 11 of the embodiment is applied to a hybrid vehicle including an internal-combustion engine and an electric motor serving as drive sources, the present invention is not limited thereto. The present invention may be applied to a vehicle including only an internal-combustion engine serving as a drive source.

What is claimed is:

1. A blockage diagnosis device that is applied to a fuel tank system including a fuel tank for containing fuel, a canister for adsorbing fuel vapor generated in an internal space of the fuel tank, and a vent passage for communicating between the internal space of the fuel tank and the canister, and that performs blockage diagnosis on the vent passage, the blockage diagnosis device comprising:
an information acquiring unit that acquires information on an internal pressure of the vent passage;
a flow rate controller that performs flow rate control of fluid in the vent passage by operation of negative pressure source; and
a blockage diagnosis unit that performs blockage diagnosis on the vent passage, based on a change over time in the internal pressure of the vent passage in association with the operation of the negative pressure source, wherein
a blockage diagnosis period during which the blockage diagnosis on the vent passage is performed includes a first period of time that starts at an operation starting time of the negative pressure source or after lapse of a first predetermined time relative to the operation starting time, and a second period of time that ends at an operation finishing time of the negative pressure source or at a time going back from the operation finishing time by a second predetermined time, the first and second periods of time being shifted from each other so as not to be overlapped with each other, and
the blockage diagnosis unit includes:
a primary determination unit that estimates in the first period of time, a sealed spatial volume of a fuel vapor sealing system including the vent passage and the fuel tank based on a time length required for reducing the internal pressure of the vent passage by a first differential pressure in association with the operation of the negative pressure source and an emission speed of the fluid, and then performs a primary determination of the vent passage, based on whether a first estimation volume obtained by the estimation exceeds a preset threshold volume; and a secondary determination unit that estimates in the second period of time, the sealed spatial volume based on a time length required for reducing the internal pressure of the vent passage by a second differential pressure in association with the operation of the negative pressure source, and a reference emission speed of the fluid, and then performs a secondary determination of the vent passage, based on whether a second estimation volume obtained by the estimation exceeds the threshold volume, wherein the primary determination unit of the blockage diagnosis unit, if the first estimation volume is less than the threshold volume, makes a primary determination indicating that the vent passage is blocked, the secondary determination unit of the blockage diagnosis unit, if the second estimation volume is less than the threshold volume, makes a secondary determination indicating that the vent passage is blocked, and the blockage diagnosis unit, if the primary determination unit makes the primary determination indicating that vent passage is blocked, and the secondary determination unit makes the secondary determination indicating that the vent passage is blocked, determines that the vent passage is blocked.

2. The blockage diagnosis device according to claim 1, wherein
the first period starts at an operation starting time of the negative pressure source, while the second period of time ends at an operation finishing time of the negative pressure source.

3. The blockage diagnosis device according to claim 1, wherein the blockage diagnosis unit further includes a tertiary determination unit that makes a tertiary determination of the vent passage, based on whether the internal pressure of the vent passage has reached a preset critical pressure value, and
if the primary determination unit makes the primary determination indicating that vent passage is blocked, and the secondary determination unit makes the secondary determination indicating that the vent passage is not blocked, the tertiary determination unit of the blockage diagnosis unit makes a tertiary determination indicating that there is a minute leak in the vent passage, if the internal pressure of the vent passage at an end of the blockage diagnosis period hasn't reached the critical pressure value.

4. The blockage diagnosis device according to claim 3, wherein
the first period starts at an operation starting time of the negative pressure source, while the second period of time ends at an operation finishing time of the negative pressure source.

5. The blockage diagnosis device according to claim 3, wherein
the information acquiring unit further acquires information on atmospheric pressure and ambient air temperature, and
the blockage diagnosis unit further includes a quaternary determination unit that identifies an influence degree of the fuel vapor on an accuracy of the blockage diagnosis based on the information on atmospheric pressure and ambient air temperature, and then performs a quaternary determination of the fuel vapor based on whether the identified influence degree of the fuel vapor on the accuracy of the blockage diagnosis exceeds a preset threshold of influence degree, wherein
if the identified influence degree of the fuel vapor on the accuracy of the blockage diagnosis is lower than the threshold of influence degree, the quaternary determination unit of the blockage diagnosis unit makes a quaternary determination indicating that the influence degree of the fuel vapor on the accuracy of the blockage diagnosis is small, and
if the primary determination unit makes the primary determination indicating that the vent passage is blocked, the secondary determination unit makes the secondary determination indicating that the vent passage is blocked, the tertiary determination unit makes a tertiary determination indicating that there is a minute leak in the vent passage, and the quaternary determination unit makes a quaternary determination indicating that the influence degree of the fuel vapor on the accuracy of the blockage diagnosis is small, the blockage diagnosis unit makes a diagnosis that the vent passage is blocked.

6. The blockage diagnosis device according to claim 5, wherein
the first period starts at an operation starting time of the negative pressure source, while the second period of time ends at an operation finishing time of the negative pressure source.

7. The blockage diagnosis device according to claim 5, wherein
if the primary determination unit makes the primary determination indicating that the vent passage is blocked, the secondary determination unit makes the secondary determination indicating that the vent passage is not blocked, the tertiary determination unit makes a tertiary determination indicating that there is a minute leak in the vent passage, and the quaternary determination unit makes a quaternary determination indicating that the influence of the fuel vapor on the accuracy of the blockage diagnosis is large, the blockage diagnosis unit suspends the blockage diagnosis on the vent passage.

8. The blockage diagnosis device according to claim 7, wherein
the first period starts at an operation starting time of the negative pressure source, while the second period of time ends at an operation finishing time of the negative pressure source.

* * * * *